US007418311B1

(12) United States Patent
Lagassey et al.

(10) Patent No.: US 7,418,311 B1

(45) Date of Patent: Aug. 26, 2008

(54) PORTABLE DISPENSING DEVICE FOR REFRESHMENTS AND SUNDRIES

(75) Inventors: Paul J Lagassey, Vero Beach, FL (US); Ben Junior Bush, Pembroke Pines, FL (US); Gary A. Crain, Cooper City, FL (US); Ronald Greene, Hollywood, FL (US)

(73) Assignee: Golf Concessions LLC, Pembroke Pines, FL (US)

( * ) Notice: Subject to any disclaimer, the term of this patent is extended or adjusted under 35 U.S.C. 154(b) by 0 days.

(21) Appl. No.: 11/440,319

(22) Filed: May 22, 2006

Related U.S. Application Data

(60) Provisional application No. 60/683,739, filed on May 23, 2005.

(51) Int. Cl.
*G06F 17/00* (2006.01)

(52) U.S. Cl. ....................... 700/236; 700/231; 700/232; 700/242; 700/244; 221/150 R; 222/146

(58) Field of Classification Search ......... 700/231–244; 221/1–312 C
See application file for complete search history.

(56) References Cited

U.S. PATENT DOCUMENTS

| | | | | |
|---|---|---|---|---|
| 3,884,386 | A * | 5/1975 | Urcola | 221/7 |
| 4,194,647 | A * | 3/1980 | Spurrier | 221/97 |
| 4,629,090 | A * | 12/1986 | Harris et al. | 221/7 |
| 4,676,074 | A * | 6/1987 | Morgan et al. | 62/277 |
| 4,823,984 | A * | 4/1989 | Ficken | 221/96 |
| 5,165,645 | A | 11/1992 | Brown | |
| 5,395,011 | A | 3/1995 | Kennedy | |
| 5,419,154 | A | 5/1995 | Christoff | |
| 5,535,883 | A * | 7/1996 | Henderson | 206/427 |
| 6,173,582 | B1 * | 1/2001 | Hixson | 62/457.4 |
| 6,183,029 | B1 * | 2/2001 | Deaton | 296/37.1 |
| 6,267,111 | B1 | 7/2001 | Burton | |
| 6,345,852 | B1 | 2/2002 | McCarthy | |

(Continued)

*Primary Examiner*—Gene O. Crawford
*Assistant Examiner*—Michael K Collins
(74) *Attorney, Agent, or Firm*—Malin Haley DiMaggio Bowen & Lhota, P.A.

(57) ABSTRACT

A portable dispensing system comprising a vending machine including an upper snack-holding portion, an intermediate beverage-holding portion, a lower refrigeration portion, contained within a housing that fits within the basket of a golf cart. The snack-holding portion and the beverage-holding portion occupy a common cabinet being separated by an insulating wall, allowing a refrigeration mechanism within the refrigeration portion to refrigerate the beverage-holding portion without refrigerating the snack-holding portion. The cabinet is disposed above the basket within the golf cart, and may be provided with a pair of belts for fastening the dispensing system to the golf cart. Within the snack-holding portion, snacks are held in a plurality of snack-holding bins, with similar snacks being stored in a single bin, separated from one another by sliding platforms. When a sliding platform is pulled away, the snack product resting atop the sliding platform is released to fall downward into a lowest position within the bin, to be retrieved by the user through a door. Within the beverage-holding portion, cans are stored in a plurality of columns to be retrieved through doors. An inventory management system is disclosed for controlling and monitoring the dispensing of refreshments and sundries. The inventory management system including a systems for electronically accepting payment, a system for monitoring inventory levels, and a system for wirelessly communicating with a remote terminal.

12 Claims, 28 Drawing Sheets

U.S. PATENT DOCUMENTS

| | | | | |
|---|---|---|---|---|
| 6,360,140 | B1 * | 3/2002 | Vidondo | 700/236 |
| 6,381,966 | B1 * | 5/2002 | Barrow | 62/3.61 |
| 6,786,303 | B2 * | 9/2004 | Allen | 186/32 |
| 6,862,896 | B1 * | 3/2005 | Seidl | 62/457.4 |
| 7,024,882 | B2 * | 4/2006 | Carmichael et al. | 62/457.5 |
| 7,044,344 | B2 * | 5/2006 | Winkler | 224/274 |

* cited by examiner

FIG. 1A
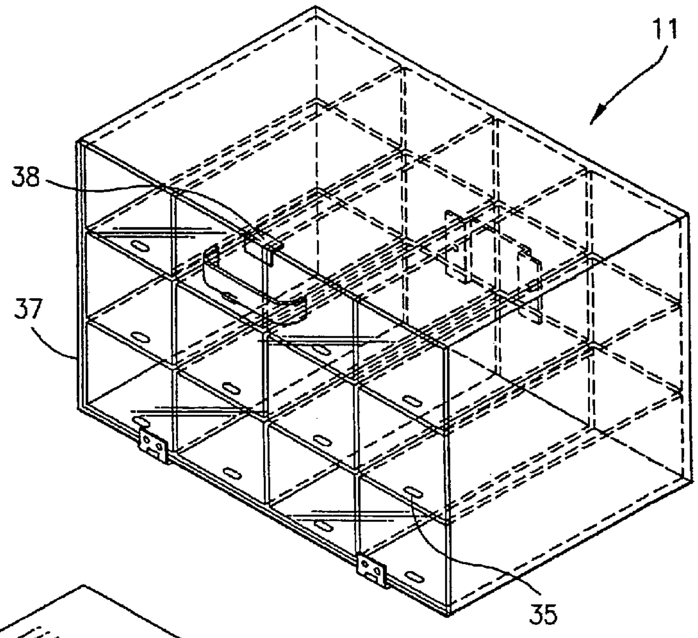
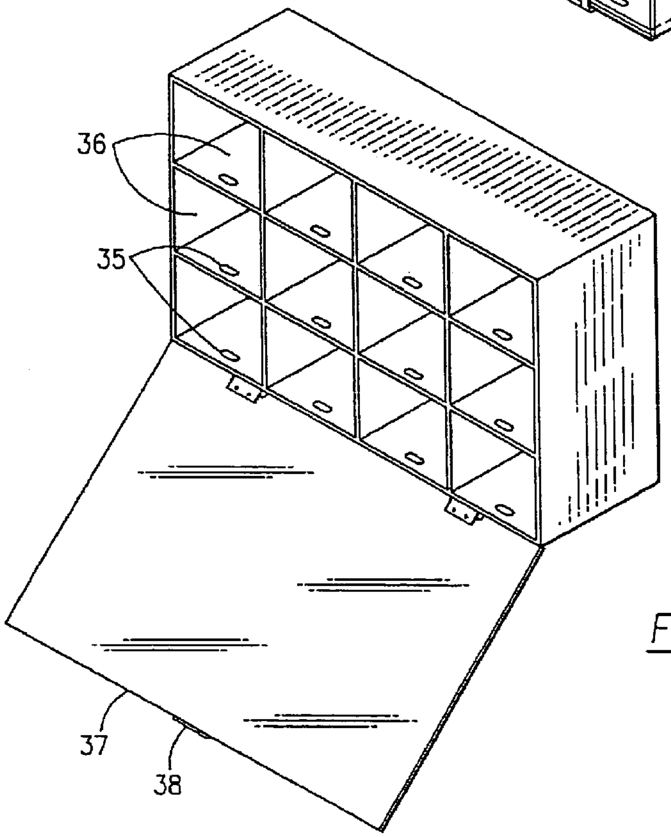
FIG. 1B

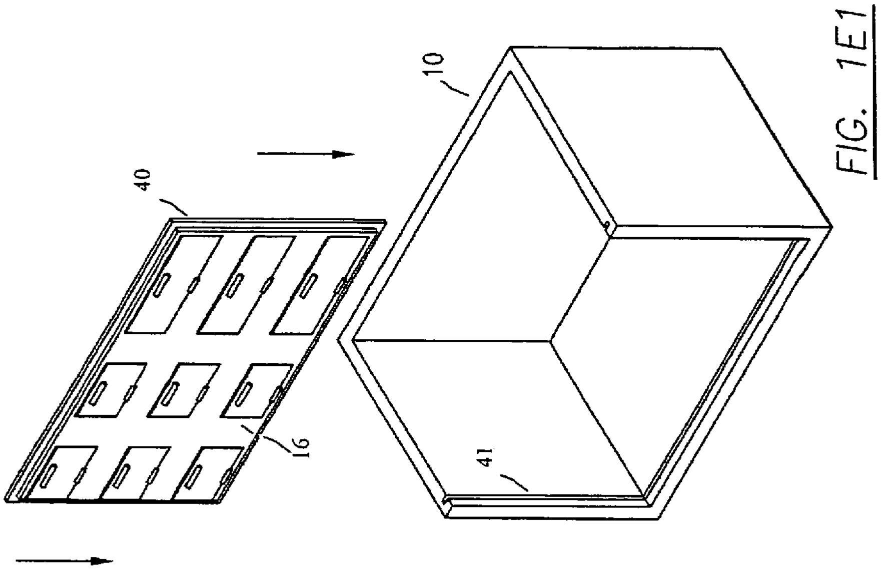
FIG. 1E1
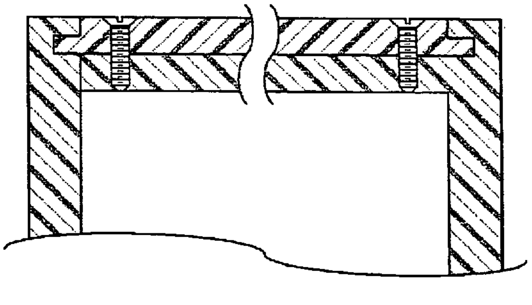
FIG. 1E3
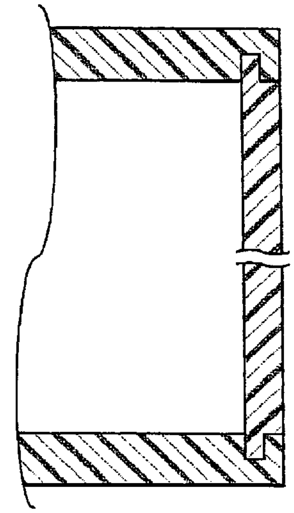
FIG. 1E2

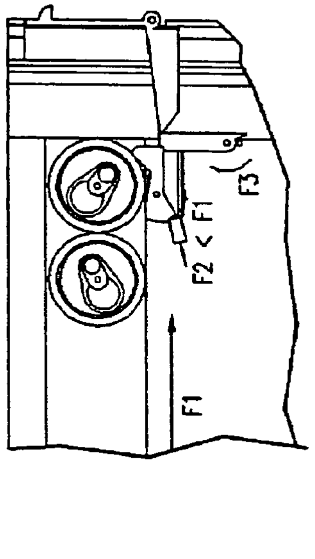
FIG. 3J1
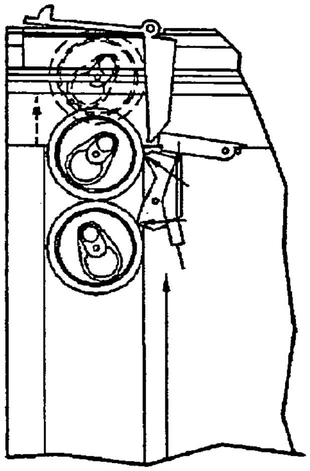
FIG. 3J2
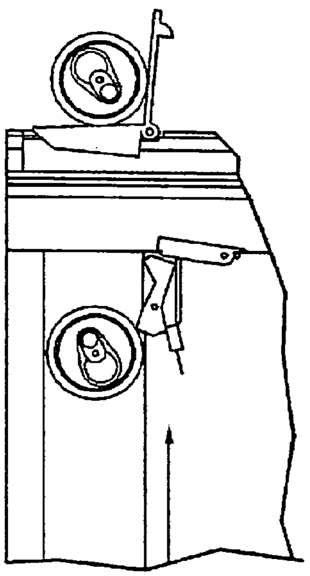
FIG. 3J3
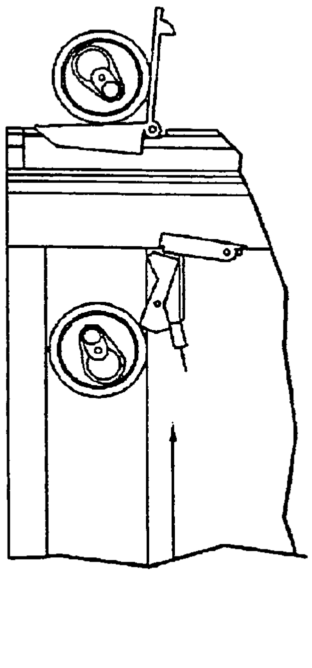
FIG. 3J4
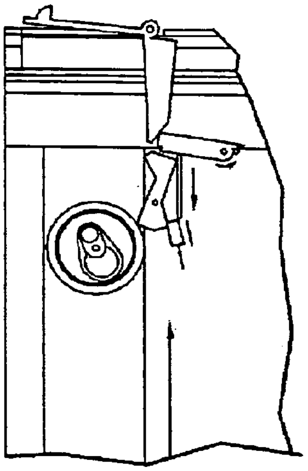
FIG. 3J5
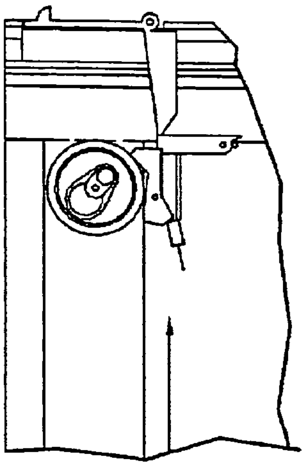
FIG. 3J6

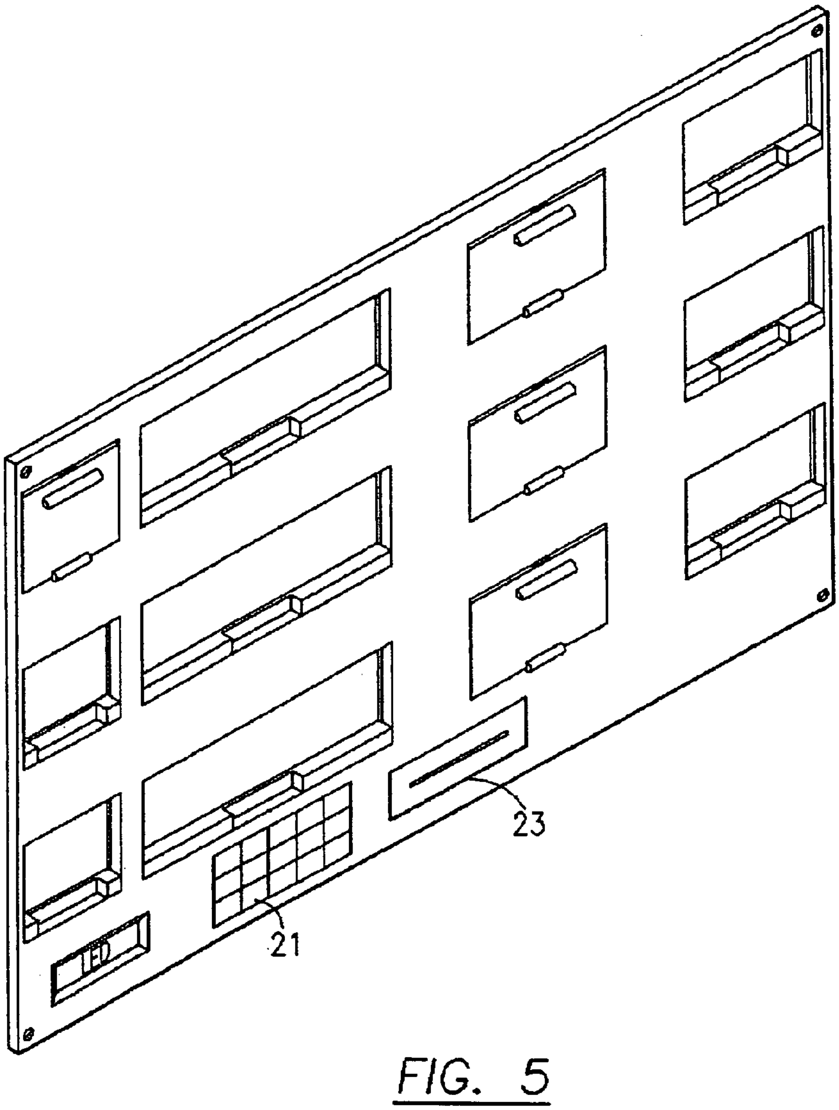
FIG. 5
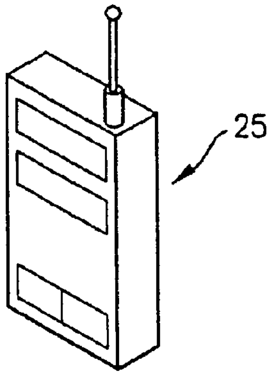

PORTABLE DISPENSING DEVICE FOR REFRESHMENTS AND SUNDRIES

CROSS REFERENCE TO RELATED APPLICATIONS

This application claims the benefit of provisional U.S. patent application Ser. No. 60/683,739, filed May 23, 2005.

STATEMENT REGARDING FEDERALLY SPONSORED RESEARCH AND DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The invention relates generally to portable refreshments and sundries dispenser devices, and specifically to portable refreshments and sundries dispenser devices that may be mounted onto vehicles such as golf carts or any other movable or fixed object.

2. Description of Related Art

Often it is desirable to have refreshments and sundries readily available on demand to consumers who may not have access to stores or to other vendors that carry such items. One example is during a round of golf, where players are scattered over a large area that by necessity do not have numerous facilities available for the purchase of refreshments or sundries. Although these items may be available for purchase at a clubhouse or through stationary vending machines, or even from vendors that may travel around the golf course for the purpose of selling these items to golfers, the availability of the items is often too limited for many players. In addition, players may have a need or impulse at times to purchase such items as tees, golf balls or golf gloves, regardless of where the players are located on the golf course. For example, having these items readily available in a dispenser that travels with the consumer benefits both the consumer (in this example the golfer) and the vendor (in this case the golf course operator). The golfer has immediate access to beverages and sundries and the golf course operator can increase sales by satisfying the golfer's immediate need to buy.

Certain containers and/or mounted beverage containers for use on vehicles are known in the art. The basic cooler is well known. Mounting brackets specifically designed for the portability of coolers on pull-type gold carts have been disclosed. For example, U.S. Pat. No. 4,889,267 issued to Bolton, which is hereby incorporated by reference in a manner consistent with this disclosure, discloses a cooler caddy for a pull-type golf cart and discusses a holder structure for holding the cooler and an attachment for removably attaching the holder structure to the golf cart. U.S. Pat. No. 4,989,767 issued to Buschbom, which is hereby incorporated by reference in a manner consistent with this disclosure, discloses a golf cart cooler that is releasably mounted on the front end of a motorized golf cart. The cooler may be mounted either on the inside of the front end of the cart or the outside of the cowling. U.S. Pat. No. 5,409,154 issued to Blount, which is hereby incorporated by reference in a manner consistent with this disclosure, discloses a support device for removably attaching a cooler to a pull-type golf cart.

Other coolers for mounting to motorized-type golf carts are also known. For example, U.S. Pat. No. D432,363 issued to Bassford et. al., which is hereby incorporated by reference in a manner consistent with this disclosure, discloses a design for a cooler for golf carts. U.S. Pat. No. 5,535,883 issued to Henderson, which is hereby incorporated by reference in a manner consistent with this disclosure, discloses' an insulated beverage box with a dispenser for liquid beverages that is compatible with golf cart baskets. This box has a plurality of chambers for the storage of various beverages, and is insulated to hold cold beverages. U.S. Pat. No. 6,183,029 issued to Deaton, which is hereby incorporated by reference in a manner consistent with this disclosure, discloses a storage compartment for use with motorized golf carts.

Still other references disclose portable cooler holders. For example, U.S. Pat. No. 5,165,645 issued to Brown, which is hereby incorporated by reference in a manner consistent with this disclosure, discloses a mounting device for holding a cooler on an external vehicle surface or vessel. U.S. Pat. No. 5,395,011 issued to Kennedy, which is hereby incorporated by reference in a manner consistent with this disclosure, discloses a mountable beverage cooler and dispenser system. The housing comprises a circular roof and a cylindrical wall. The primary purpose of the invention is to mount beverage cooler and dispenser systems on a golf cart or bag. U.S. Pat. No. 5,419,154 issued to Christoff, which is hereby incorporated by reference in a manner consistent with this disclosure, discloses a beverage container with a mounting bracket for use with a golf cart or any other surface having a support member to which the container can be attached. Japanese Patent No. JP6018138 issued to Nobuaki, which is hereby incorporated by reference in a manner consistent with this disclosure, discloses a soft drink selling device that can be installed in a vehicle, such as a taxi, comprising a small-sized refrigerator.

Other references have disclosed portable vending devices. For example, U.S. Pat. No. 6,267,111 issued to Burton, which is hereby incorporated by reference in a manner consistent with this disclosure, discloses a portable self-contained mobile vending device that allows a mobile food vendor to offer a buffet style set up of foods, with a minimal amount of set-up. The mobile device can include a variable number of chafing dish compartments. U.S. Pat. No. 6,345,852 issued to McCarthy, which is hereby incorporated by reference in a manner consistent with this disclosure, discloses a mobile vending assembly with a portable structure that encloses and protects a vending machine. The invention is directed to a structure for enclosing, protecting, and transporting vending machines to a desired location.

SUMMARY OF THE INVENTION

The present invention allows a vendor to provide refreshments and sundries for sale at the demand of persons who may be geographically distant from a stationary vending machine or store when the purchaser has access to a vehicle, vessel or object to which the portable dispensing device is mounted, and allows various means of accounting for the purchase to accommodate the needs of the vendor. Further, the invention allows a vendor to increase sales of certain items at the demand of a purchaser rather than at a later time when that same purchaser may no longer be willing to purchase at a later time, for example once the purchaser finishes a round of golf or reaches a stationary vending machine or store. Accordingly, the vending system may communicate with a remote system, to establish pricing, verify credit or debit purchase account information, or otherwise provide remote data communications. Further, the system may also vend information or services, rather than simply goods. For example, a videoconferencing system may permit a golf pro to remotely provide feedback or advice to a player during a round.

It is a feature of the invention to provide a system and method for the portable or remote sale and dispensing of refreshments and/or sundries.

It is a feature of the invention to provide a system and method for the portable dispensing of refreshments and/or sundries from a device that may be mounted on any vehicle or vessel, and particularly a vehicle or vessel that is rented or otherwise hired for use by the potential purchaser. In an alternate use, the invention can be mounted on a fixed object at a desired location.

It is another feature of the invention to make refreshments and/or sundries readily available on demand to consumers who have rented or hired a vehicle or vessel to which the portable dispensing device is mounted when those consumers are geographically distant from a stationary vending machine or store so that the purchase can occur immediately at the time when the customer may be in need of, or impulsed to buy such items.

It is yet another feature of the invention to provide a portable dispensing device of refreshments and/or sundries capable of being mounted onto a vehicle, vessel or fixed object that can be adjusted to provide for the containment and thus restrict delivery only under conditions of sale, of items of a variety of sizes.

The invention is an apparatus, and method for providing refreshments and/or sundries for sale through a portable dispensing device. The portable dispensing device is mountable on a variety of surfaces and may be mounted on vehicles, vessels or objects for easy access by intended consumers. Typically, the vehicles or vessels will be available for rent or hire to potential consumers such as golfers using golf carts, but the portable dispensing device may also be mounted to a fixed object where traffic will pass by. Alternatively, the portable dispensing device may be releasably mounted and transported on vehicles, vessels or objects so that they can be removed from their mounting by the vendor for stocking or maintenance purposes, or alternatively it may be towed behind or along side a vehicle or vessel or pushed in front of a vehicle or vessel. When the portable dispensing devices are mounted in a releasable manner, a security mechanism can be employed to prevent removal by unauthorized persons.

The portable dispensing device preferably includes a variety of compartments of various widths which serve as dispensing rows. The width and configuration of the dispensing rows are sized according to the items that will be dispensed, and in the preferred embodiment are built into the portable dispensing device so they are fixed in width and placed with dividers used to separate the dispensing rows. The space in the dividers between the dispensing rows can be insulated or filled with cold or hot packs to maintain the desired temperature of the contents of the adjoining dispensing rows. Alternatively, the portable dispensing device can be constructed without dividers to separate dispensing rows, and the width and configuration of the dispensing rows can be adjusted using several methods. One method is to utilize a number of portable inserts sized for placement into the portable dispensing device appropriately in width so that container rows in the portable inserts that hold the items to be dispensed correspond to dispensing doors on the front panel of the portable dispensing device. In other embodiments, inserts with fixed dispensing rows of the desired width are placed inside the portable dispensing device and the width and configuration of the dispensing rows can be adjusted by changing these inserts. Another method for adjusting the width and configuration of the dispensing rows is to construct the portable dispensing device so that the dividers that separate the dispensing rows can be inserted into grooves or slots at the desired points along the inside of the portable dispensing device to create dispensing rows of the desired widths and configuration.

Where external power is available, such as in a powered vehicle, the dispensing system may be provided with active cooling or heating. The dispensing system may also accommodate bulk items, such as bulk nuts and candies, or bulk beverages, such as coffee, iced tea, or water. It is preferred that the bulk dispensing mechanism be modular and interchangeable with a dispensing system for unit packed goods.

Portable inserts sized and designed for placement into the dispensing rows and constructed with a plurality of container rows are used to contain and transport the items being dispensed for loading them into the portable dispensing device. The container rows in each portable insert allow a variety of items to be stocked in each portable insert, and overall in the portable dispensing device. The portable inserts are constructed and sized to fit inside various sized dispensing rows of the portable dispensing device, and are open on one end for loading with different refreshments and/or sundries. A removable or retracting portable insert cover is placed over the opening of the portable for transporting for loading inside the various dispensing rows in the portable dispensing device.

If desired, the portable inserts can be constructed with insulation to insulate the contents from the contents of adjoining portable inserts. Alternatively, the walls of the portable inserts may include space for inserting ice, cold packs or hot packs to maintain the temperature of the contents. Alternatively, battery, electric or solar powered cooling or heating devices may be used for this purpose.

The portable inserts and their contents can be loaded into the portable dispensing device either at the location of the portable dispensing device by transporting the portable inserts to the portable dispensing device, or by bringing the portable dispensing device to the location where the portable inserts are loaded. One surface of the portable dispensing device preferably has an opening with a cover that may be hinged or otherwise removable such that the inside of the portable dispensing device is accessible for loading and unloading the portable inserts into the interior compartment. While the top surface is the preferred surface to use for the opening through which portable inserts are placed, in alternate embodiments, any surface of the portable dispensing device can be used for that purpose. In order to prevent the opening and unauthorized removal of items from the portable dispensing device while in use, a security mechanism such as a seal or lock can be attached to the cover for the top surface.

After the portable inserts are loaded inside the portable dispensing device, the portable insert cover is removed or retracted to allow the items inside to move into place to be dispensed.

As an alternative to portable inserts with container rows, each dispensing row can be divided into multiple container rows, although only one container row can be used, in which case the dispensing row and container row are the same.

Another aspect of the invention provides an opening on one side that is covered by a front panel for the portable dispensing device. The front panel is designed such that it includes a dispensing door for each container row of items to be dispensed. The size and placement of each dispensing door on the front panel corresponds to the size and placement of the container rows in the portable inserts placed inside of the dispensing rows inside the portable dispensing device. The front panel is preferably attached to the front of the portable dispensing device and secured in such a manner so that it can not be removed or tampered with by the end user. One such method is to secure the front panel with the same securing mechanism that prevents the cover over the top surface from being opened while it is being used. Another is to use screws or nuts with non-standard heads that cannot be removed without special equipment.

Using detachable panels facilitates servicing of the portable dispensing device in the field by allowing defective parts contained within the device to be replaced quickly without taking the entire portable dispensing device out of service. For example, a front panel can be removed and replaced quickly in the field, and the front panel with defective parts can be serviced remotely. It also makes construction of the housing of the portable dispensing device simpler and less expensive because all the moving parts and wiring can be included in the detachable front panel. However, in an alternate embodiment a removable front panel is not utilized and the dispensing doors, wiring and metering device are built into the housing of the portable dispensing device.

In its simplest form, accounting for items taken from the portable dispensing device can be done manually by counting the items after each use. Alternatively, this accounting can be performed automatically and/or electronically. If accounting is done electronically, each dispensing door on the front panel is connected such that it is capable of communicating with a metering device that is mounted in the front panel or on another location on or within the portable dispensing device. This metering device is used to record the opening of each door and/or extraction of an item, and can be programmed to charge the desired amount for the item being dispensed each time a door is opened and/or an item extracted. The accounting may be performed locally or through real-time wireless communication. The accounting may also be completed as the metering device is returned to a service center. Suitable wireless technologies may include, for example, 802.11x, 802.16, cellular (analog or digital), ISM band, and/or GPRS.

Alternatively, the dispensing doors on the front panel may be locked such that a door is released upon the payment of the correct charge for the item or by the recording of the charge for the item in a memory such that the purchaser can later reconcile payment for the item with the vendor. The metering device may be adapted or connected to communicate with a payment receiving device that can receive either money, credit cards, debit cards, stored value cards, or other types of credit cards, or by use of a device, such as a magnetic stripe card or RFID transponder, that identifies the purchaser such that the amount of the purchase can be added to the purchaser's account for later reconciliation. Alternatively a keypad can be attached to the metering device so that the consumer can choose which door they want to unlock and open. This keypad can be part of the metering device or can be located in the front panel or elsewhere on the portable dispensing device.

The metering device may also maintain a master count to keep record of use between master readings and/or over the life of the metering device which is useful for management, accounting and auditing purposes. To limit access to this data to authorized personnel, security means can be employed in the metering device so that only an external meter reading device with the appropriate security access can gain access to data to audit sales from the portable dispensing device, to reset the master meter count, and to program the amount to be charged for the items being dispensed from behind each door. A biometric security device (for user and/or service) or two-factor authentication system may also be implemented, as appropriate. The vendor, or an agent of the vendor, can use the keypad if present, or the external meter reader to then reconcile the payments either through depositing cash, completing the transactions if made by credit card, debit card, or other credit instrument, or by accepting cash or credit cards, debit cards, stored value cards, or other form of payment at another location. For example, the vendor may either directly accept payment at the site where the portable dispensing device is returned after use, or may authorize someone at that site to accept payment and then reconcile with the third party. The external meter reading device can also be used to reset the meter count for the next user.

Additionally, one or more external dispensing devices can be attached to the sides of the portable dispensing device. The external dispensing devices can contain items that cannot be readily dispensed from behind the doors of the portable dispensing devices. Ideally, the external dispensing devices are constructed so that the items inside are visible to the consumer, and the external dispensing device opens to allow the consumer to access the items inside. A seal can be used to determine if the external dispensing device has been opened and alerts the vendor to inventory the items inside for the purpose of charging the consumer for the items dispensed. The external dispensing device can also be attached to the metering device to notify the vendor if the external dispensing device has been opened.

A bar code (e.g., UPC or SKU code) reader or RF-ID system may be used to account for sales during use, or inventory after return of the system. Thus, if the external dispensing device is configured to ensure that an item being withdrawn passes a reader, oriented as may be required, the dispensing may be automatically accounted for.

Finally, the portable dispensing device may be mounted on an angle so the items to be dispensed move forward toward the dispensing doors by gravity. In an alternate embodiment, the portable dispensing device is mounted level on its surface and the items to be dispensed are advanced by springs, actuators, or other methods are placed in the portable inserts in order to cause the items to be dispensed to advance within toward the dispensing doors.

According to a preferred embodiment, the portable refreshments and sundries dispenser devices may be adapted to dispense a variety of refreshments and sundries according to the use of the devices and the size of the dispensed items. A front panel has doors to dispense items. Items can be accounted for manually, or in its preferred embodiment, the doors of the front panel are connected to a metering device that detects and records the opening of each door for later reconciliation for payment for the dispensed items. Each door is designed such that only one item is dispensed upon opening of the door. Each time a door is opened the metering device records the amount charged for the item dispensed from behind that door. The metering device is programmable so the amount being charged for the item behind each door can be set to the desired price. The refreshments and sundries may be dispensed upon the payment of money, by credit, debit, stored value or other types of credit or accounting instruments. The dispensing device alternatively may include a device that can record a purchase for later payment by the purchaser, in which case a credit account is maintained. In case of a debit system, the doors do not open unless an appropriate form and amount of payment is rendered.

Other features and advantages of the invention will become apparent from the description of the preferred embodiments in conjunction with the following figures.

BRIEF DESCRIPTION OF THE DRAWINGS

The invention will be described with reference to the accompanying drawings, in which like elements are referenced with like numerals.

FIG. 1A depicts an optional external dispenser which can be attached to the outside of the portable dispensing device.

FIG. 1B depicts the optional external dispenser with a single dispensing door.

FIGS. 1E1-1E3 show another method for attaching the front panel using multiple tongue and grooves on multiple sides of the front panel and portable dispensing device in a manner that holds the front panel in place and facilitates quick and easy removal and replacement. The top cover is used to secure the front panel and prevent unauthorized removal.

FIG. 3J1 to 3J6 depicts one method of using a retractable stop to prevent the items from advancing into the dispensing doors prior to the time of dispensing.

FIG. 5 depicts a removable front panel with openings and dispensing doors of various sizes, a visual display for displaying information on usage and charges, a keypad and a payment device for accepting electronic forms of payment or identifying the purchaser for use in conjunction with the metering device. Also depicted in FIG. 5 is an optional external meter reading device.

FIG. 6 depicts an embodiment where the width and configuration of the dispensing rows are adjusted by using different size portable inserts.

DETAILED DESCRIPTION OF THE INVENTION

Figure 1:
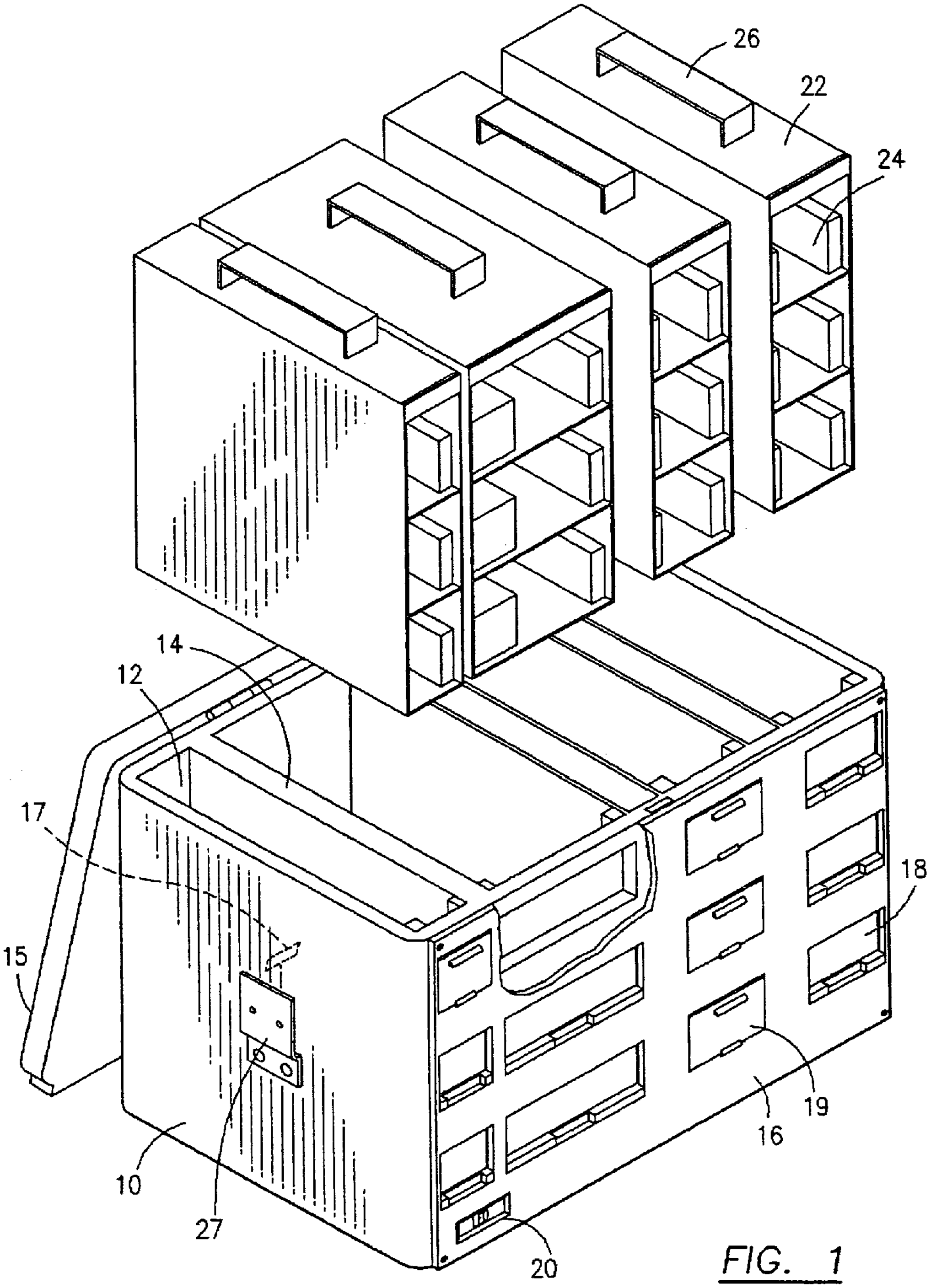
FIG. 1 is a schematic of the preferred embodiment of the invention illustrating a portable dispensing device.

The invention relates generally to portable refreshments and sundries dispensing devices, and specifically to portable refreshments and sundries dispensing devices that may be mounted onto vehicles such as golf carts or any other vehicle, vessel or fixed object, herein referred to as "portable dispensing device." In the preferred embodiment the invention is designed to facilitate easy stocking, servicing and tracking of sales, and to be rugged so as to withstand being transported in various environments. Typically, the portable dispensing device is intended to be mounted on a vehicle or vessel that is rented or otherwise hired such as a golf cart or a boat, but may also be mounted to a fixed object where traffic will pass by or on any moving object. In the preferred embodiment, the portable dispensing device can be mounted directly to the desired object, or mounted on a frame that is attached to the desired object. According to one embodiment of the invention, the portable dispensing device is releasably mounted so the vendor can easily remove it for maintenance or stocking. When releasably mounted, a security mechanism may be used to inhibit removal from the releasable mount by unauthorized persons.

The portable dispensing device may be attached to a moving vehicle, vessel or object, or a stationary object, and typically consists of a body much like that of an insulated cooler or a small refrigerator. A top or side cover that can be opened and closed or removed and replaced is used to access the inside for stocking the items to be dispensed, and to prevent unauthorized removal of said items. Dispensing rows are located inside the portable dispensing device and portable inserts are used to stock the items to be dispensed.

The items inside the device are preferably dispensed through a front panel with dispensing doors. In its simplest form, accounting for the items dispensed from the portable dispensing device can be taken by manual count. In its preferred embodiment, the dispensing doors include sensing devices that communicate with a metering device each time a dispensing door is opened or an item is removed. The metering device typically contains memory and processing means that are common to such devices, and a visual display so that the metering device can be read and programmed. The metering device may be programmable so that the appropriate charge for the item behind each dispensing door can be programmed and the charge recorded each time a dispensing door is opened, and can be read and reset by the vendor either directly from the visual display or with an external electronic meter reading device. While the use of a metering device connected to sensors in each dispensing door is the preferred means for keeping track of the items dispensed from the portable dispensing device, this is not intended to be limiting, and any means for keeping track of the items dispensed including mechanical means or a physical count of items can be employed, the object being to determine how many of each item is taken by a consumer while using the portable dispensing device.

In the preferred embodiment, the structure of the portable dispensing device comprises a body with internal space configured to accommodate the items to be dispensed. This body can have the appearance of the structure of a large portable cooler or a small refrigerator. The body typically has a top or side cover that is opened and closed, or removed and reattached, to allow stocking of items to be dispensed and one or more openings on one side or end to allow items to pass from inside the device to the purchaser. It should be noted, however, that the body may be adapted such that stocking of items can be accomplished from any side, top, or bottom.

The portable dispensing device may be stocked to dispense a variety of refreshments including canned or bottled drinks, snack foods and a variety of sundries according to its use. For example, if the portable dispensing device is mounted on a golf cart, the sundries may include such items as soda, beer, water, juice, sports drinks, snack foods, sunscreen, golf tees, batteries, golf gloves, golf balls, or any other suitable refreshment or sundry item. The system may also vend services or media, in which case the accounting system for the sundry or refreshment system is involved with delivery of both physical and intangible elements.

The interior of the portable dispensing device may be designed to contain the items to be dispensed, and in the preferred embodiment is divided into dispensing rows, as described below, which may be fixed in width and place or adjustable using one of numerous methods. Built-in dividers, also described below, can be used to separate the dispensing rows. The space between the dividers that separate the dispensing rows can be insulated to assist in maintaining the temperature of the contents of each dispensing row so that cold, room temperature and hot items can be placed side-by-side. If desired, in order to further assist in maintaining temperature, the dividers can be constructed with open space between the dispensing rows instead of or together with insulation so ice, cold or hot packs can be inserted into this space to help maintain the desired temperature of the contents of the portable dispensing device.

In alternate embodiments, the portable dispensing device can be constructed such that the width, placement and number of dispensing rows can be adjusted to meet the needs and requirements of individual vendors. Constructing the portable dispensing device with adjustable sized dispensing rows makes it possible to adapt a particular sized body to a wide variety of configurations rather than constructing many different models for different combinations of items to be dispensed. For example, one vendor may want to distribute only 12 ounce cans, and another vendor may want to distribute a combination of cans or bottles which require different sized dispensing rows.

In these alternate embodiments, several methods can be used to adjust the width, placement and configuration of the dispensing rows. One method is to utilize portable inserts that are sized appropriately in width so that together they fit within the portable dispensing device at desired locations corresponding to the dispensing doors in the front panel. Although in this alternate embodiment it is desirable to use separate portable inserts for each dispensing row in order to reduce the weight of each portable insert, in this configuration a portable insert can contain multiple dispensing rows so that less portable inserts are required. For example, in a configuration where the portable dispensing device has four dispensing rows, two portable inserts each containing two dispensing rows, or a single portable insert with four dispensing rows can be used. In alternate embodiments, inserts with dispensing rows of the desired width are placed inside the portable dispensing device as opposed to constructing the device with fixed width dispensing rows. In this way, the width and configuration of the dispensing rows can be adjusted by changing the portable inserts and replacing the front panel with one that has dispensing doors aligned with desired configuration of portable inserts.

Another method that can be used to adjust the width and configuration of the dispensing rows is to construct the portable dispensing device so that the dividers that separate the dispensing rows can be inserted at the desired points along the inside of the portable dispensing device to create dispensing rows of the desired widths and configuration to match the front panel being used.

In yet another alternate embodiment, the inside of the portable dispensing device can be constructed to accommodate the items without the use of any portable inserts, such that the dispensing rows are divided into container rows, and the items to be dispensed are placed directly inside the container rows in the portable dispensing device without the use of any portable inserts. In embodiments where there is only one container row to each dispensing row, then the dispensing row and container row are the same. This alternate embodiment also makes it possible to dispense the items inside with or without the use of individual dispensing doors. To accomplish this, the front panel or top cover opens to expose all the dispensing rows and sensors can be used to record and transmit the removal of an item to the metering device. The use of such sensors is well known in the art.

In the preferred embodiment, a plurality of portable inserts each constructed with a plurality of container rows sized and shaped to accommodate the items being dispensed, and sized for placement into the various dispensing rows are used to stock the portable dispensing device. Each portable insert is open on one end, where that end is disposed such that it mates with the front panel of the portable dispensing device when it is inserted. Container rows within the portable inserts are loaded with the items to be dispensed from the open face. Different refreshments, sundries or other items may be loaded in each container row.

In the preferred embodiment, after the portable inserts are stocked, a removable or retractable portable insert cover may be placed over the open end to maintain the contents while the portable inserts are being transported to and loaded inside the portable dispensing device. This portable insert cover preferably is designed to substantially seal the open end of the portable inserts for ease of handling during transport of the portable inserts. The preferred mode is a panel that slides along slots or grooves in the open end of the portable inserts. For example, an acrylic sliding panel may be mated to slots or grooves located substantially along the vertical outer walls of the open end of the portable inserts, which may be inserted or removed by sliding the panel in one or the other direction of the slots or grooves. Other fastening mechanisms are also suitable for attaching this portable insert cover, and the manner of fastening is not intended to be limiting. While it is desirable to use portable insert covers as described above to secure the contents inside the portable inserts, any method that will keep the contents inside the portable inserts can be used. As with the method of fastening, the use of such a cover is not intended to be limiting, the object being to keep the contents from moving while the portable inserts are in transit or loading. For example, a post or strap going down the middle of the open end of the portable inserts is sufficient to retain the contents inside.

As an additional security measure, the portable inserts and the portable insert covers may be sealed after loading of the items to be dispensed such that the seal remains sealed until the portable insert is loaded into the portable dispensing device.

For ease of handling, each portable insert may have one or more exterior handles located such that the carrying and loading of the portable inserts is facilitated.

The portable inserts can be pre-loaded at a central location with a variety of refreshments and sundries and transported to the portable dispensing devices at remote locations. Alternatively the portable dispensing devices may be brought to the central location for stocking.

In one embodiment, the portable inserts are placed inside the dispensing rows of the portable dispensing device such that the open end mates with the front panel, and so the container rows of the portable inserts are substantially horizontal to level ground.

In an alternate embodiment, the portable inserts are constructed so that the container rows are disposed at an angle to level such that items to be dispensed have a tendency to advance toward the front panel of the portable dispensing device. In this embodiment, the portable dispensing device can be mounted on the level.

After the portable inserts are placed inside the dispensing rows, the portable insert covers are removed or retracted to allow the contents to move into place for dispensing through the front panel of the portable dispensing device. Later, the portable insert covers may be reinserted for removal and transport of the portable insert back to the central location, and removed or retracted again when the portable inserts are to be restocked.

In some configurations, when the portable inserts are removed from the portable dispensing device, there will be "orphan" items left inside the dispensing doors. In some embodiments, the "orphan" items must be manually removed from each dispensing door after the portable inserts are covered and removed. In other embodiments, the items may be either returned to their respective container rows inside the portable inserts by gravity or mechanical means, or prevented from advancing into the dispensing doors until a consumer is ready to dispense an item. The preferred method for managing these "orphan" items is shown in FIG. 4*a*, which employs a hinged mounting bracket that permits the portable dispensing device to be tilted back, causing the items to return back into their respective container rows by force of gravity. Although this is the preferred means for returning the items back to the container rows, other mechanical means such as a lever or other mechanical device that pushes the items back into the container rows when activated (not shown) can be employed, and the method depicted in FIG. 4*a* is not intended to be limiting. For example, another method for returning the items back into their respective container rows inside the portable inserts is to use levers or some other mechanism to physically push the items out of the dispensing doors back into the container rows.

Figure 6:
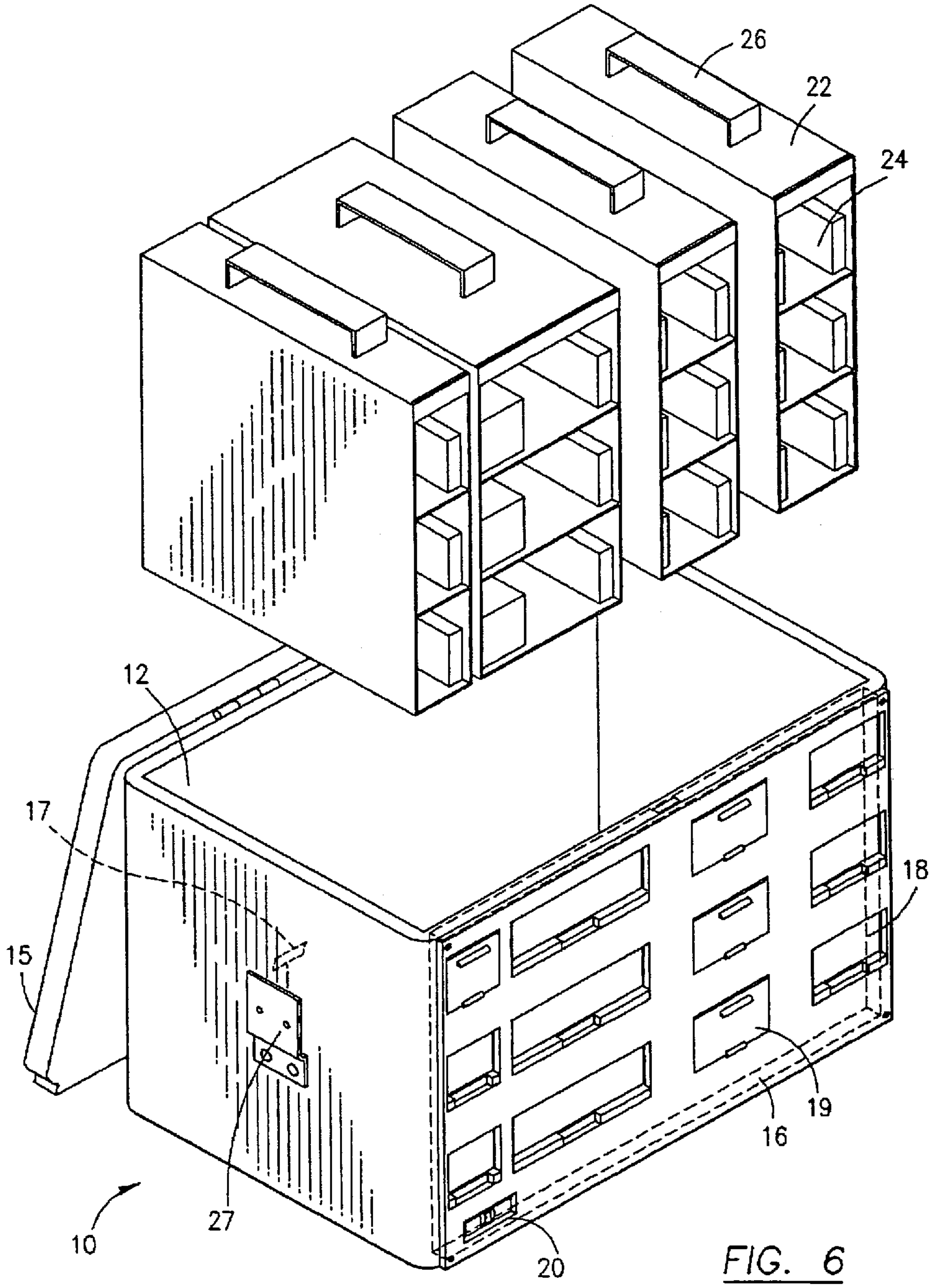

Another way to manage the problem of "orphan" items is to prevent the items from advancing into the dispensing doors until the consumer is ready to dispense an item. One such method is to use a retractable stop in each container row that prevents the items from advancing into the dispensing doors until activated. For example such a retractable stop can be attached to and activated by the same mechanism that allows the consumer to open the dispensing door, or it can be activated by a separate mechanism which is triggered by the consumer as the dispensing door is opened or just before the dispensing door is opened. FIGS. 3J1 to 3J6 shows one such method for employing a retractable stop which is activated by opening a dispensing door, however, there are many other possible methods for preventing the items from advancing into the dispensing door prior to dispensing, and the method illustrated in FIGS. 3J1 to 3J6 is not intended to be limiting.

The outside walls of the portable dispensing devices may be insulated in order to help maintain the desired temperature of the items to be dispensed. In addition to insulation, the portable dispensing devices may have the capability of being cooled, or heated. For example, ice, cold packs or other frozen items may be placed in the walls of the portable dispensing device or within the dividers between the dispensing rows to maintain the desired temperature level (cold, hot or atmospheric) of each dispensing row. Alternatively, battery, electric or solar powered cooling or heating devices may be installed in the top surface or any other side of the portable dispensing device to maintain the desired temperature.

The top surface of the portable dispensing device of the preferred embodiment has at least one opening and a cover which may be hinged or otherwise attached so that it can be opened or removed such that the inside of the portable dispensing device is accessible for inserting and removing the portable inserts. In order to prevent the opening and unauthorized removal of items from the portable dispensing device while in use, a security mechanism such as a seal or lock can be attached to the cover comprising the top surface. Although the top surface is the preferred surface for the opening through which the portable inserts are placed inside, in an alternate embodiments, any surface of the portable dispensing device can be used for this purpose. In yet another alternate embodiment, instead of using individual dispensing doors, the front panel, as described below, opens to allow access to the inside so consumers have direct access to the dispensing rows. In this embodiment, sensors are used to sense and record the removal of an item.

To minimize the chance of placing items inside the incorrect dispensing rows, the portable inserts and the inside of the dispensing rows may be constructed such that each dispensing row mates with and accepts only one type of portable insert. Several methods well known in the art are suitable for use in the portable dispensing device. When employed, this design is intended to minimize the possibility of stocking more expensive items inside dispensing rows that are programmed for less expensive items or visa versa. In an alternate embodiment, the present invention contemplates providing software and electronic communications features that inventory management functions, including allowing pricing changes from a remote computer terminal. For example a portable insert that contains beer cannot be mistakenly placed inside a dispensing row intended for less expensive soda. In this regard, the system may also provide an age verification function for such age limited items as beer and cigarettes. For example, a video camera with wireless transmission function may require the vendee to present himself and age identification for remote verification before the vending operation is permitted. The remote verification location therefore views the image of the person, image of the identification, possible encoded and/or authentication information on the identification, and makes a decision as to whether the image of the person matches the photo ID, and whether the photo ID is authentic, and whether the photo ID shows an appropriate age. In one embodiment, the user may be required to swipe his/her drivers license such that information may be obtained from the magnetic strip affixed thereto for the purpose of verifying the identity and age of the prospective purchaser. If all of these are true, then the item is released for sale. The vending system may also store the authentication for a period of time, allowing subsequent vends without reauthorization. The authentication may also occur when the system is checked out by the user. The system may also have a breath alcohol sensor, to limit sales of alcoholic beverages if the user is already intoxicated, which may be locally or remotely controlled.

The front panel is attached to the front of the portable dispensing device in a way that makes it simple to attach and detach by the operator, and is secured in such a manner so that it cannot be removed or tampered with by the consumer or others. For example, screws with non-standard heads can attach the front panel, or the front panel can slide into one or more slots or groves or notches, and can be held in with or without other methods. The front panel can also be secured from unauthorized removal by utilizing the same securing mechanism that prevents the covering over the top surface from being opened. This can be done by having the securing mechanism engage with the front panel, or by having the cover for the top surface close over the top of the front panel to help hold it in place. This method of attaching and securing the front panel prevents unauthorized removal of the contents, and facilitates the quick and easy replacement of the front panel when a part malfunctions. These various methods for attaching and securing the front panel are not intended to be limiting, and various methods known in the art or to be developed can be used to secure the front panel in place, the object being to facilitate removal and replacement of the front panel, and to prevent unauthorized removal of the front panel and the items inside the portable dispensing device while it is in use.

In the preferred embodiment, a detachable front panel is used for many reasons including ease of maintenance. It contains all moving and electronic parts so that a front panel with a defective part can be changed quickly thereby minimizing the downtime of the portable dispensing device. However, in an alternate embodiment, the dispensing doors, electronics and metering device can be built into the front of the portable dispensing device.

In another alternate embodiment, instead of utilizing portable inserts, the items to be dispensed are loaded directly into dispensing rows fixed inside the portable dispensing device to be dispensed through dispensing doors when the front panel is closed. In yet another alternate embodiment, the front panel does not have dispensing doors and instead opens to expose the dispensing rows. In this alternate embodiment, a sensor in communication with the dispensing rows and the metering device records the removal of each item by a purchaser.

As stated, there are many reasons for using a detachable front panel, the most important of which is ease of maintenance, cleaning and repair. A portable dispensing device with faulty parts can be repaired quickly, simply by replacing the front panel. Instead of replacing the faulty parts on-site or removing the device from its mounting for service causing extended down-time, a front panel with faulty parts can be detached and replaced quickly, and the defective parts can then be serviced in a remote location at the convenience of the vendor. Further, using detachable front panels allows the configuration of the dispensing rows in alternate embodiments to be more easily modified as described above, by replacing the front panel with a different front panel to correspond with the desired configuration of the items to be dispensed. Detachable front panels also make the construction of the body of the portable dispensing device simpler and more cost efficient as all moving and electrical parts are contained within the front panel instead of being part of the device itself. While the body of the portable dispensing device can be manufactured in many shapes and sizes, a detachable front panel allows a body of one particular size and shape to be used for many different configurations of dispensing rows, so that a few models can be adapted to a wide variety of needs of individual vendors. With a detachable front panel, the remainder of the device may be relatively permanently mounted, thus discouraging theft, while maintaining ease of service.

The dispensing doors on the front panel are sized and placed to align with the respective dispensing rows in the portable dispensing device and with the respective container rows in the portable inserts such that the items to be dispensed can move freely through the dispensing doors.

The dispensing doors are designed to make unauthorized removal of items difficult, and to prevent more than one item from being removed each time a dispensing door is opened. In the preferred embodiment, this can be accomplished by designing the dispensing doors so only one item can be removed each time a dispensing door is opened. In alternate embodiments, a simple dispensing door is used and other mechanisms are used to prevent more than one item from advancing and being dispensed whenever a dispensing door is opened. In each case, a sensor connected to the metering device records the removal of each item. The dispensing doors can be constructed of a clear see-through material so that the purchaser can see what is behind each door, or each dispensing door can be labeled to indicate the contents of that container row.

To prevent accidental or unintentional opening, the dispensing doors are equipped with a mechanism that prevents the door from opening unless the purchaser intentionally triggers this mechanism for the intended dispensing door. This mechanism preferably is sufficiently strong to prevent the door from opening while the vehicle or vessel is traveling over rough terrain or experiencing sudden acceleration or changes in direction. This mechanism may also be connected to the retractable stop, if one is used, or the retractable stop can be activated by the opening of the dispensing door itself.

Alternatively, instead of recording when a dispensing door is opened, the dispensing doors on the front panel may be locked such that a door is released only upon the payment of the correct charge for the item in advance, or by the recording of the charge for the item in a memory such that the purchaser can later reconcile payment for the item with the vendor. The metering device may be adapted or connected to communicate with a payment receiving device that can receive either money, credit cards, debit cards, stored value cards, or other types of credit cards, or by use of a device, such as a magnetic stripe card, smart card, or RFID transponder, that identifies the purchaser such that the amount of the purchase can be added to the purchaser's account for later reconciliation.

In the preferred embodiment, each dispensing door communicates with a metering device that is located on the front panel or at some other location on or within the portable dispensing device. Each time a door is opened, the metering device records the opening and assesses the correct charge for the item behind that dispensing door. In alternate embodiments the sensors used to detect the removal of an item are likewise connected to a metering device.

In some embodiments, a keypad can be attached to the metering device so that the consumer can choose which door they want to unlock and open. If desired, this keypad can be located on the front panel as part of the metering device, or can be located elsewhere on the portable dispensing device and capable of communicating with the metering device. The metering device may also have programming or a timing mechanism that is capable of recording and indicating sales of items from the portable dispensing device in given time periods, and may also be programmed to allow the purchaser to identify himself or herself prior to unlocking a dispensing door. See, "d-Fenfluramine Selectively Decreases Carbohydrate Snacking by Obese Subjects", Int. J. Eating Disorders, 4(1):89-99 (1985) (web.mit.edu/click/www/pdf/592.pdf). It is noted that the system can also be used to track food (or other item) consumption of a person or group, in order to perform studies or analysis thereof.

When the vehicle or vessel is returned to the location from which it was rented or otherwise hired, or in the case of a portable dispensing device mounted on a fixed object, the vendor may need to read the metering device in order to determine and record the items purchased for inventory purposes, and the total amount of purchases for payment by the consumers. The reading of the meter may be done visually directly from the visual display, or may be done electronically with an external device using any communication method now known or later developed, including all wireless or wired connections.

If included, a keypad can be used by the operator or vendor to read the metering device. The operator or vendor can also use the metering device to program the desired charge for the items behind each dispensing door, and for auditing purposes by the owner/operator of the portable dispensing device. When the dispensing doors are locked as described above, the keypad can be used by the purchaser to select which dispensing door they want to unlock and open.

In embodiments without a keypad, the metering device may be read, programmed and audited using an external device that connects to the metering device either directly or by wireless means, for example a hand held device, portable computer or flash memory. Methods for retrieving data from and programming electronic devices are well known in the art that are suitable for use in the device. If desired, an external device can be used to read and program the metering device even if a keypad is used.

The metering device can be read after each round of use in order to collect the necessary data. It can then be reset for the next user or round of use, although the metering device may be programmed to automatically reset itself each time it is read. It may also be reset and programmed by some other method that is accessible only to the vendor.

The external meter reading device or keypad can also be used to program the appropriate charge for the items behind each dispensing door.

The metering device can be programmed to maintain a master count to keep a record of use between master readings and/or over the life of the respective metering device. This is useful for management, accounting and auditing of sales and statistics. A third party, such as the owner of the portable dispensing device or rights thereto, can use an external meter reader to audit, reset and program the meter. The auditing capabilities are particularly useful under circumstances where the third party is to be paid a portion of the proceeds from the portable dispensing device. This is also useful to the vendor in determining the sales level of various items for merchandising purposes. If desired, the metering device can be programmed with a special pass code or other security means to limit access to this data and programming only to authorized individuals. For example, an employee may have access only to read and reset the metering device between each use, whereas a manager may have access to program charges, and the owner/operator may have yet a higher level of security for auditing purposes. Methods of securing electronic data are well known in the art and suitable for use in the portable dispensing device.

When the metering device is read after each use, the vendor or an agent of the vendor can reconcile the payments either through depositing cash, completing the transactions if made by credit card, debit card, or other credit instrument, or by accepting cash or credit cards, debit cards, stored value cards, or other form of payment at another location. For example, the vendor may either directly accept payment at the site where the portable dispensing device is returned after use, or may authorize someone at that site to accept payment and then reconcile with the third party. Regardless of the method used to read the metering device, the appropriate data is retrieved so the consumers can be charged the appropriate amount. Various micropayment and/or aggregation schemes may be employed to reduce the administrative overhead of traditional credit or debit card transaction processing. Likewise, the user charges may be linked to a cellular telephone charge account. For example, the system may include a cellular telephone transceiver. The user submits a short message service (SMS) code which identifies himself to the system. A WiFi (802.11) or BLUETOOTH™ transmission between a user personal digital assistant (PDA) and/or cell phone may also be used, avoiding remote transmission of the authentication and/or activation message. The code may be a serial number of the vending device, for example. The user then opens a door (which may be locked until authorization is received), which then causes an accounting transaction, resulting in transmission of the activity characteristics through the cellular transceiver to a remote database. The charge may then appear on the cellular telephone bill, aggregated with other transactions, and therefore with reduced per-transaction administrative cost.

Additionally, one or more external dispensing devices can be attached to the sides of the portable dispensing device. The external dispensing devices can contain items that are not readily dispensed from behind the doors of the portable dispensing devices. Ideally, the external dispensing devices are constructed so that the items inside are visible to the consumer, and the external dispensing device has one or more panels that open to allow the consumer to access the items inside. In its simplest embodiment, a breakable seal or seals can be used to determine if the external dispensing device has been opened and alerts the vendor to inventory the items inside for the purpose of charging the consumer for the items dispensed. The external dispensing device can also be attached to the metering device to notify the vendor if it has been opened, and in more sophisticated embodiments, the external dispensing device can be connected to the metering device and uses sensors to record the removal of items.

In the preferred embodiment, the portable dispensing device is mounted on a vehicle, vessel or object at an angle relative to level such that the items to be dispensed have a tendency to advance towards the front panel and to the dispensing doors. In an alternate embodiment, the portable inserts are constructed and disposed in the portable dispensing device at an angle to level such that items to be dispensed have a tendency to advance toward the front panel and the portable dispensing device can be mounted level to the ground. In another embodiment, the portable dispensing unit is mounted level on its surface and the items to be dispensed advance by other methods which apply pressure or force from the rear of the dispensing row so the items move forward in the dispensing row each time an item is removed.

In yet another alternate embodiment, the portable dispensing device is mounted level to the surface, and the portable inserts or fixed dispensing rows are constructed with vertically descending gravity fed reversing direction container rows so that the items to be dispensed advanced by gravity much like in some vending machines.

A mounting bracket can be used to mount the portable dispensing device or it can be attached directly to the desired vehicle, vessel or object. If a mounting bracket is employed, the mounting bracket can be used to mount the portable dispensing device at the desired angle to level. The mounting bracket can also include means that allow the portable dispensing device to be unlatched, tipped back and held in place to force items from the dispensing doors back into the portable inserts at the time of removal. Finally, the mounting bracket can be releasable so as to allow the portable dispensing device to be removed from its mounting quickly and easily. If a releasable mounting bracket is employed, a security mechanism such as a lock or screws with non-standard heads can be employed to prevent unauthorized removal of the portable dispensing device.

Finally, the portable dispensing device can be attached to and towed behind or along side a vehicle or vessel, or alternatively it can be pushed in front of the vehicle or vessel.

Although the invention is described in terms of a portable dispensing device having a plurality of dispensing rows, one or more portable inserts having container rows, a front panel with a plurality of doors substantially mated with each container row, and a metering device in communication with the doors, this description is not intended to limit the invention but is rather one embodiment as will be apparent to those skilled in the art.

Referring now to the figures, FIG. 1 depicts a schematic of the preferred embodiment of the invention illustrating a portable dispensing device 10, dispensing rows 12, dividers to separate the dispensing rows 14, a front panel 16, a top cover 15 equipped with a security or locking mechanism 17, portable inserts 22 having multiple container rows 24 for storing and stocking items to be dispensed 30 and a handle 26 for carrying.

The portable dispensing device 10 is shown apart from a vehicle or vessel on which it is typically mounted, although it may be mounted on a stationary object as well. Typically, the portable dispensing device 10 is mounted on an angle relative to level so the items 30 inside will advance forward by gravity. In alternate embodiments the portable dispensing device 10 is mounted level, and employs portable inserts 22 that are constructed to use mechanical means to cause the items 30 inside to advance as shown in FIGS. 3*d* and 3*e*. Alternatively, container rows 24 and/or portable inserts 22 may be disposed in a manner that will allow the items inside to advance by gravity as shown in FIGS. 3F, 3G and 3H.

The front panel 16 has a plurality of openings 18 that correspond with the container rows 24 within each portable insert 22 in dispensing row 12. Each such opening 18 is equipped with a dispensing door 19 and a mechanism to keep the dispensing door 19 closed unless it is deliberately opened.

A metering device 20, preferably programmable with a visual display, is also located on the front panel 16 and connected to the dispensing doors 19 such that it records the taking of an item 30 each time a dispensing door 19 is opened. The metering device 20 is capable of maintaining and displaying a record of how many times each individual dispensing door $\mathbf{19}_1$ through $\mathbf{19}_n$ is opened for purposes of charging a consumer at a later time for the items 30 that were dispensed from the portable dispensing device 10.

In alternate embodiments, the metering device 20 may be programmed such that the opening of each individual door $\mathbf{19}_1$ through $\mathbf{19}_n$ is controlled by the metering device 20 upon satisfaction of a predetermined condition such as payment. For example, the metering device 20 may include a payment device 23 (see FIG. 5) that is capable of identifying the purchaser or accepting credit cards, debit cards or other electronic means of payment or cash money by recognizing separate coins and bills, according to the desired currency. Each individual dispensing door 19 may be opened only upon the payment of a predetermined amount of money into the payment device 23 (see FIG. 5), at which time the metering device 20 sends a signal to open a dispensing door or doors 19 that require that amount of money for payment to dispense a loaded item 30. If such payment means are employed, a keypad 21 as shown in FIG. 5 can be employed to allow the consumer to choose which dispensing door 19 to open.

In another embodiment, the keypad 21 may used such that a consumer may input an authorization code previously assigned to that consumer, or swipe a card that contains readable identification information, whereupon the metering device 20 records the amount of money assigned to a dispensing door 19 that the consumer may then open.

The metering device 20 can be read from the display between uses when the portable dispensing device 10 is returned to the site from which it originated so that the vendor may charge the consumer the appropriate amount. An external electronic meter-reading device 25 (see FIG. 5) can also be employed for this purpose.

In its preferred embodiment, the invention is designed so that the front panel 16 contains most of the moving and electrical parts that could be prone to failure, and is easily removable for replacement and servicing. When the top cover 15 is closed, the security mechanism 17 also engages the front panel 16 so as to prevent unauthorized removal and access to the items 30 inside the portable dispensing device 10. In this preferred embodiment, the dividers 14 between the dispensing rows 12 can be insulated, or they can be hollow so as to accept ice, cold or hot packs for the purpose of maintaining a desired temperature for the contents. The walls of the portable dispensing device 10 can also be insulated to assist in maintaining temperature. This particular embodiment also has mountings 27 to hold an external dispenser 11 as shown in FIG. 1*a*.

FIG. 1A depicts an optional external dispenser 11 which can be attached to the outside of the portable dispensing device 10. Various rows 36 contain items 30 that cannot be readily dispensed from inside the portable dispensing device 10. A door 37 allows access to the inside of the optional dispenser 11 so the consumer can remove the desired items 30. A seal 38 can be employed to indicate if the door 37 has been opened and the items 30 inside can be inventoried manually when the portable dispensing device 10 is returned. In alternate embodiments, sensors 35 can be used to record the taking of items 30 and are connected to the metering device 20 to record the appropriate charges.

FIG. 1B depicts the optional external dispenser 11 with a single dispensing door 37, multiple dispensing rows 36 with sensors 35, and a single sealing mechanism 38.

Figure 1C:
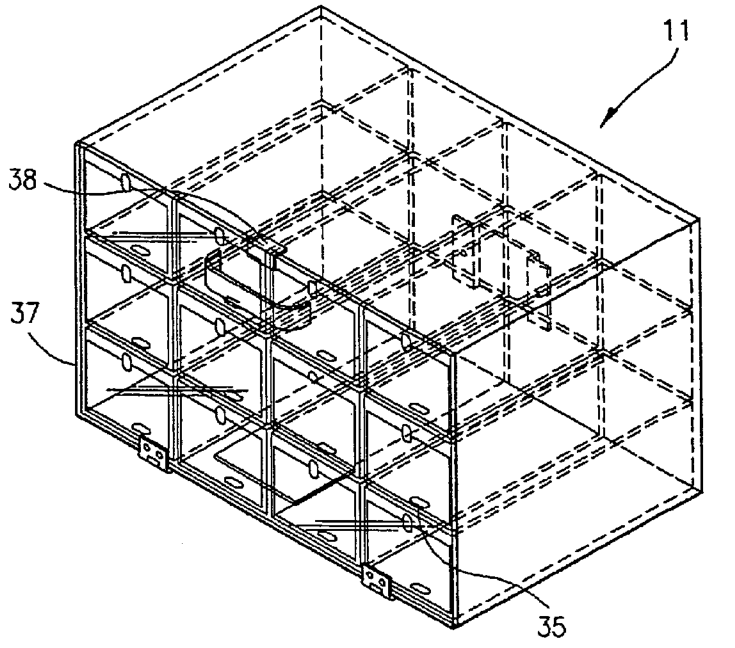
FIG. 1C depicts the optional external dispenser with multiple dispensing doors.

FIG. 1C depicts the optional external dispenser 11 with multiple dispensing doors 37, multiple dispensing rows 36 with sensors 35, and multiple sealing mechanisms 38.

Figure 1D:
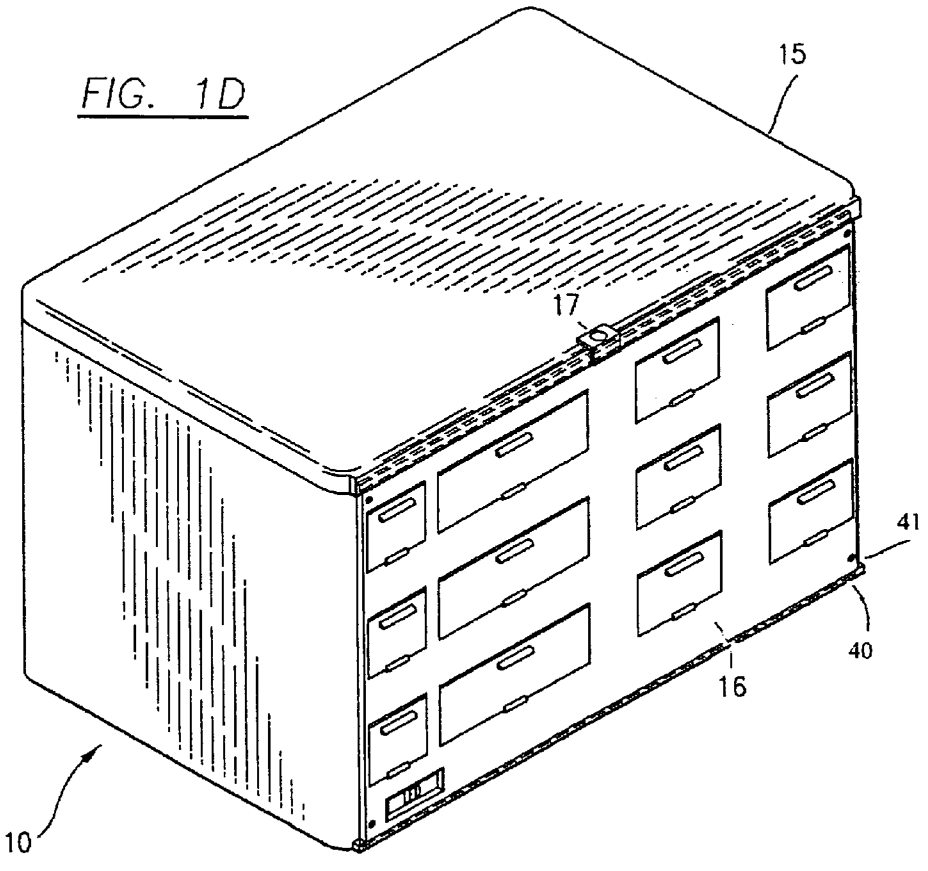
FIG. 1D shows a method for securing the front panel which employs a single tongue and groove configuration at the bottom of the front panel and the lower part of the front of the portable dispensing device. The top cover is used to secure the front panel and prevent unauthorized removal.

FIG. 1D shows a method for securing the front panel 16 which employs a tongue 40 and groove 41 configuration at the bottom of the front panel 16 and the lower part of the front of the portable dispensing device 10. The front panel 16 is mated into the front of the portable dispensing device 10 at the bottom, and the lip of the top cover 15 closes over the top of the front panel 16. In this configuration, standard means, such as screws with non-standard heads, can be employed to attach the front panel 16 to the front of the portable dispensing device 10, and the securing mechanism 17 that secures the top cover 15 can also be used to secure the front panel 16 so that it cannot be removed even if the screws are removed.

FIG. 1E shows a method for attaching the front panel 16 using multiple tongue 40 and grooves 41 on multiple sides of the front panel 16 and portable dispensing device 10. The multiple tongues 40 on the front panel 16 slide into corresponding multiple grooves 41 in the portable dispensing device 10 and to hold the front cover 16 in place without any additional means. A lip on the top cover 15 closes over the top of the front panel 16 to prevent removal of the front panel 16 when the top cover 15 is secured by the securing mechanism 17. In this configuration, no additional means are needed for attaching the front panel 16 to the portable dispensing device 10, and using the method illustrated in FIG. 1E further facilitates the quick removal and replacement of the front panel 16. The placement of the tongues 40 and grooves 41 can be reversed between the portable dispensing device 10 and front panel 16, so the tongues 40 are on the portable dispensing device and the grooves 41 are on the front panel 16.

Figure 2A:
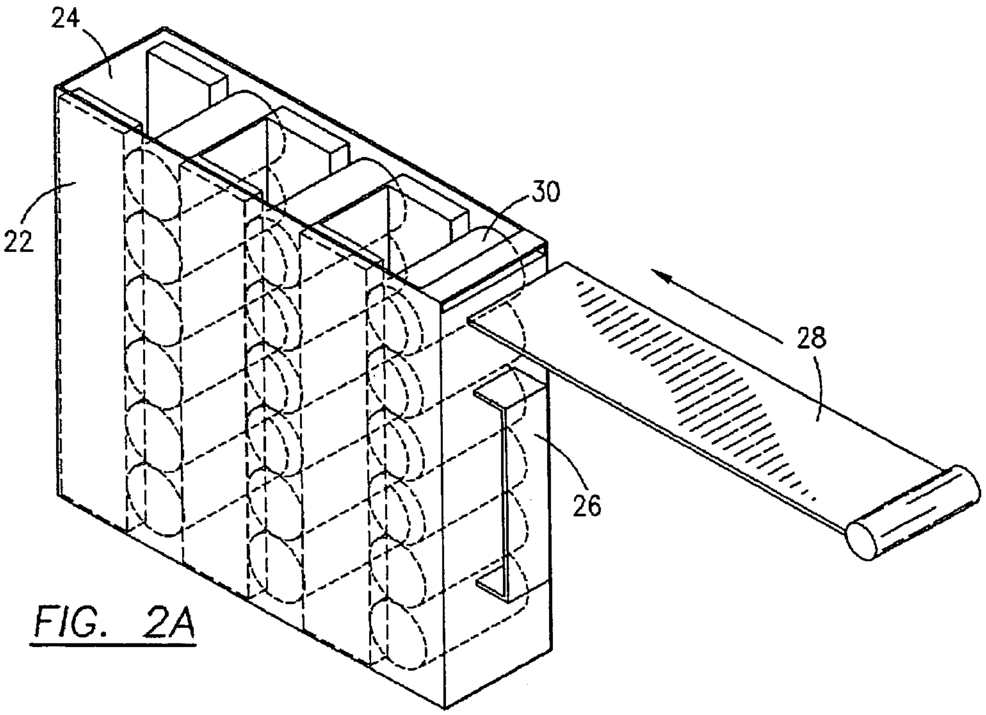
FIG. 2A is a schematic depicting the placement of items inside the portable inserts. In this case, the portable insert has three container rows.

Referring now to FIG. 2A, items to be dispensed 30, in this case beverage cans, are placed inside the container rows 24 through an opening in each portable insert 22. When the portable insert 22 is full to the desired level, a portable insert cover 28 designed to secure and keep the items 30 inside is moved into place so the items 30 will remain stable while the portable insert 22 is being transported. A handle 26 can be attached or built into the portable insert 22 to assist with carrying and transporting the portable insert 22. FIG. 2A shows insertion of the portable insert cover 28 into the portable insert 22.

Figure 2B:
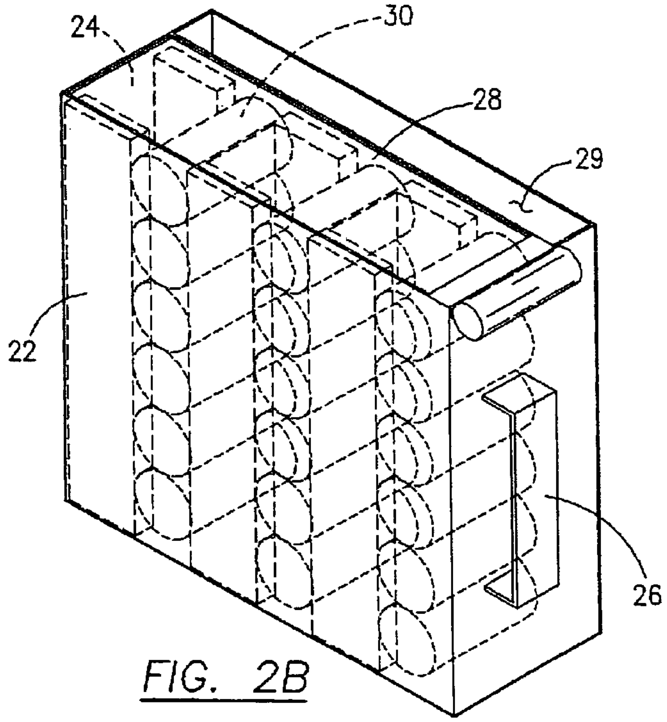
FIG. 2B is a schematic of a removable portable insert cover.

FIG. 2B shows the portable insert 22 with the portable insert cover 28 in place. Once stocked, the portable insert 22 can be placed in a cooling or heating unit to keep the contents at the desired temperature until it is time to place them inside the portable dispensing device 10, or it can be transported directly to the portable dispensing device 10 and placed inside a dispensing row 12. Once the portable inserts 22 are in place within the portable dispensing device 10, the portable insert covers 28 are removed and the items to be dispensed 30 are able to advance into position to be dispensed whenever a dispensing door 19 is opened. Prior to removal of the portable inserts 22 from the portable dispensing device 10, the portable insert covers 28 are put back into place to keep the remaining contents inside. FIG. 2B also depicts an optional pocket 29 in the portable insert 22 for placement of a cold or hot pack, or other cooling or heating device. These pockets 29 can be used either in place of or in addition to the spaces in the dividers as shown in the preferred embodiment of FIG. 1.

Figure 3A:
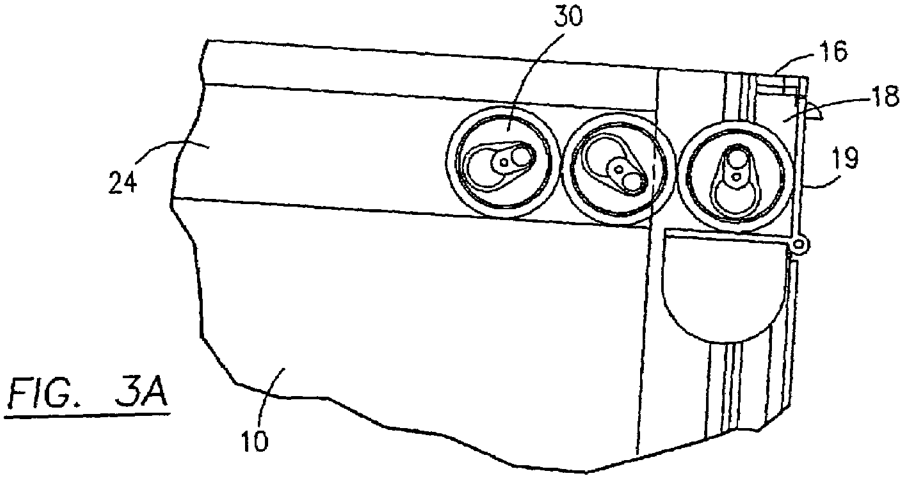
FIGS. 3A-3C are cutaway views of the portable insert inside the portable dispensing device depicting the dispensing of a beverage can from the portable dispensing device.
Figure 3B:
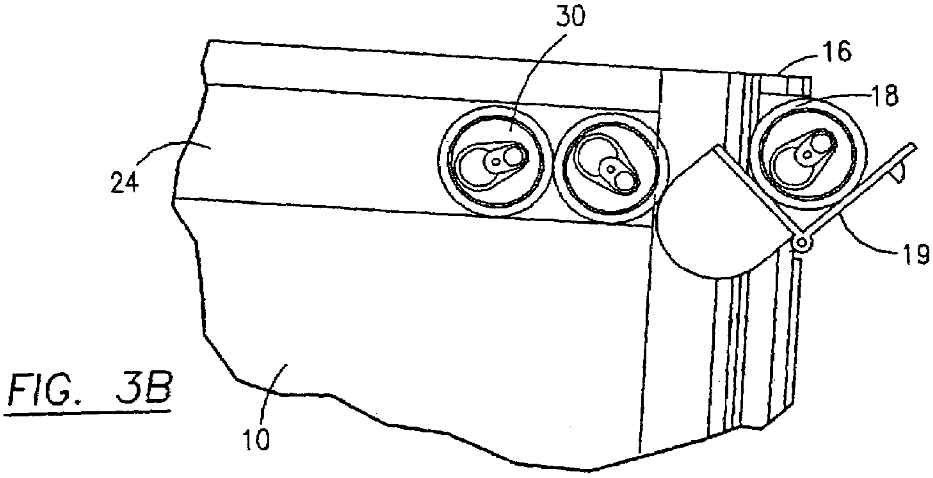
Figure 3C:
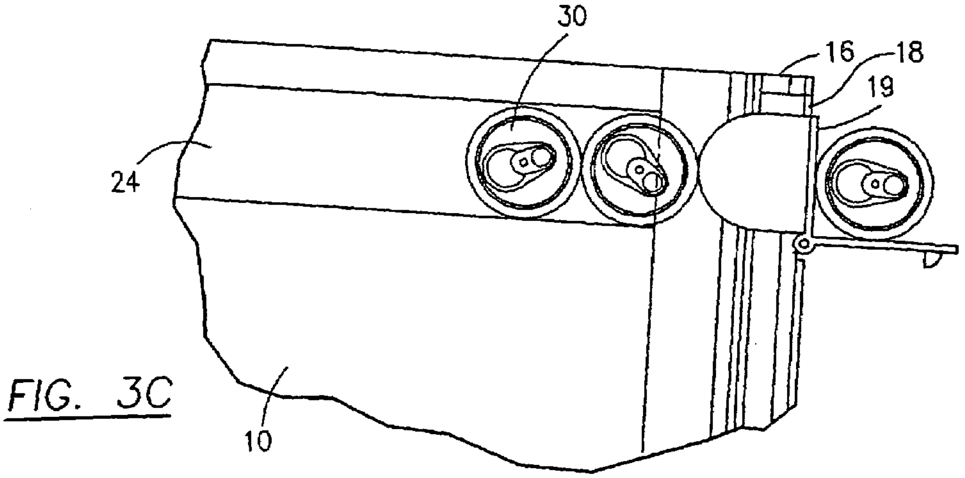
Figure 3D:
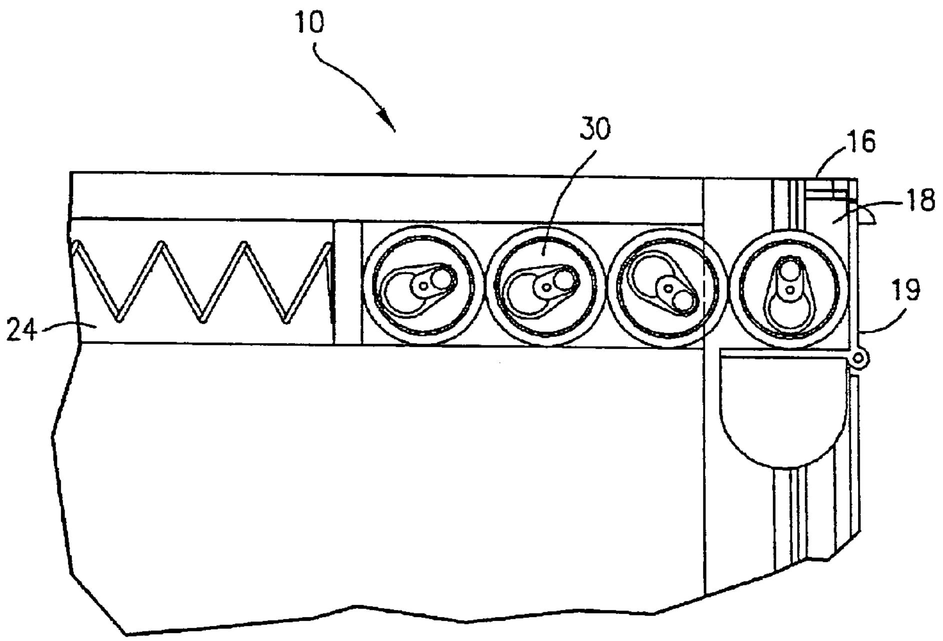
FIGS. 3D and 3E depict a blocking mechanism to allow only 1 unit to be discharged in the container row at a time.
Figure 3E:
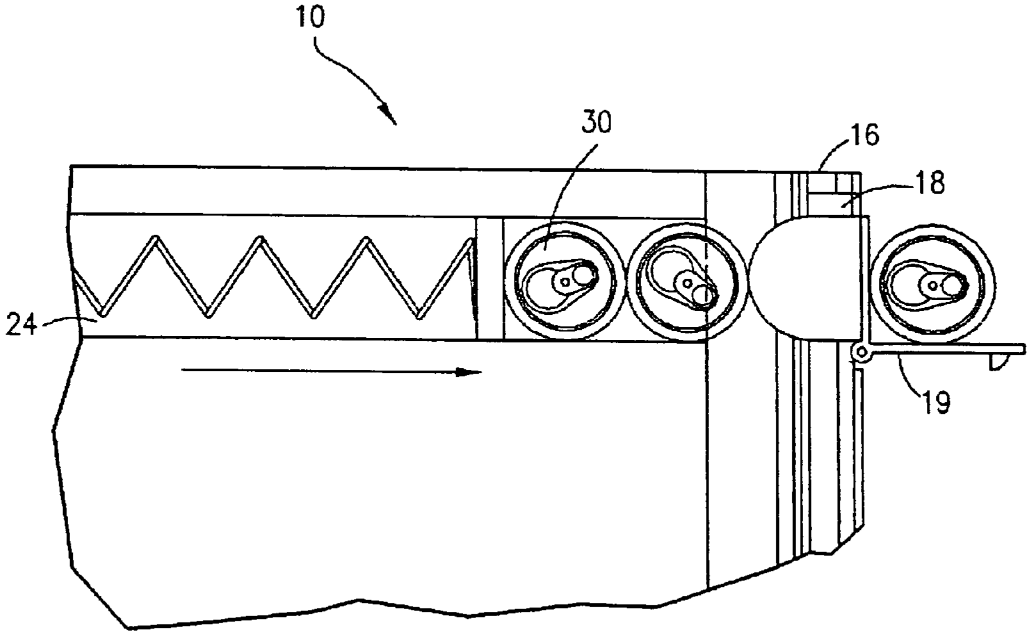
Figure 3F:
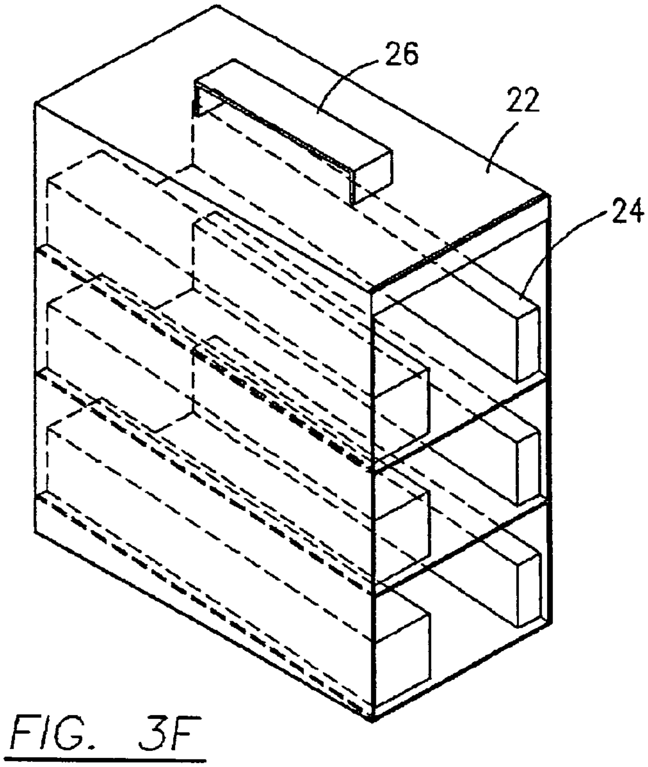
FIG. 3F depicts a portable insert constructed so the dispensing rows are at an angle to level such that items have a tendency to advance toward the dispensing door.

FIGS. 3A-3J6 are intended to show the flexibility in designing the portable dispensing device 10 and portable inserts 22 and are not intended to be limiting. Starting with FIGS. 3A, 3*b*, and 3*c*, schematic diagrams of a dispensing door 19 suitable for use in the front panel 16 of the portable dispensing device 10 are depicted. In the depicted embodiment, the portable dispensing device 10 is disposed at an angle relative to level so the items 30 inside will advance forward within the container rows 24 towards the dispensing doors 19. The dispensing door 19 is designed such that only one item 30 can be dispensed at one time upon opening of the dispensing door 19. FIG. 3*a* depicts the portable dispensing device 10 when the dispensing door is closed. At FIG. 3*b*, a consumer opens the dispensing door 19 which includes an inner shelf and a blocking device underneath the inner shelf designed such that only one item 30 can advance into and fit inside the dispensing door 22 at a single time. When the dispensing door is opened as shown in FIG. 3*c*, the item 30 that was closest to the dispensing door 22 is delivered to the consumer while the metering device 20 records the taking of the item 30 and assesses the appropriate pre-programmed charge for the item 30. The design depicted in FIGS. 3A, 3B, and 3C is not intended to be limiting, the object being to employ any design that will allow only one item 30 to be dispensed through a dispensing door 22 each time it is opened.

FIGS. 3D and 3E depict a portable insert 22 with a spring loaded mechanism at the rear for advancing the items 30 within the container rows 24 of the portable insert 22. In place of a spring loaded mechanism, other methods known in the art for advancing items can be utilized.

Figure 3I:
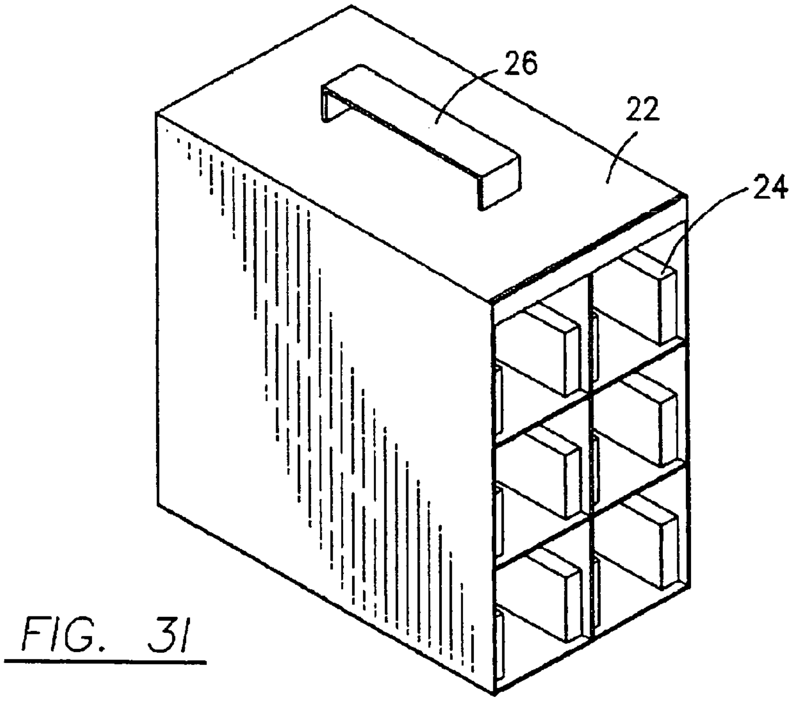
FIG. 3I depicts a portable insert with multiple dispensing rows.
Figure 3G:
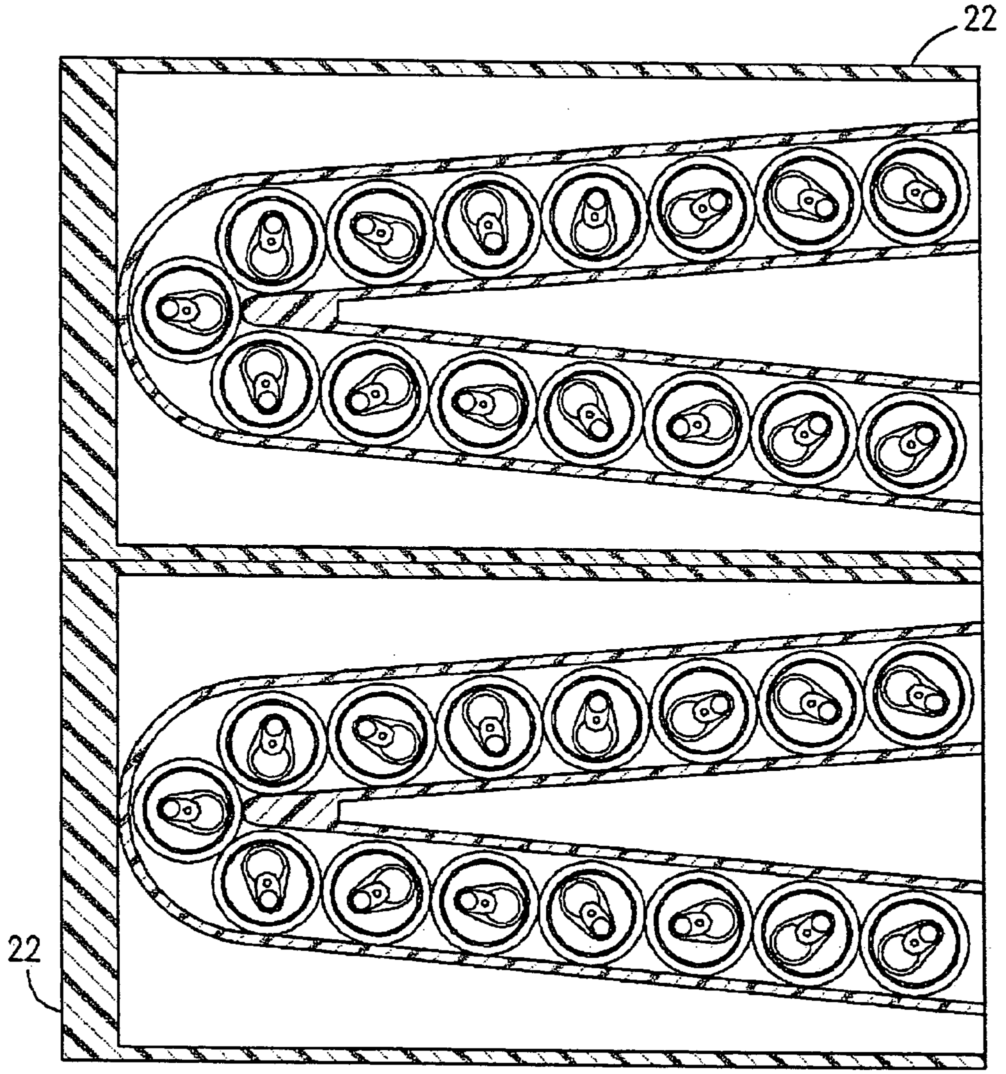
FIG. 3G depicts a portable insert with two container rows arranged in a descending configuration so the items advance automatically.
Figure 3H:
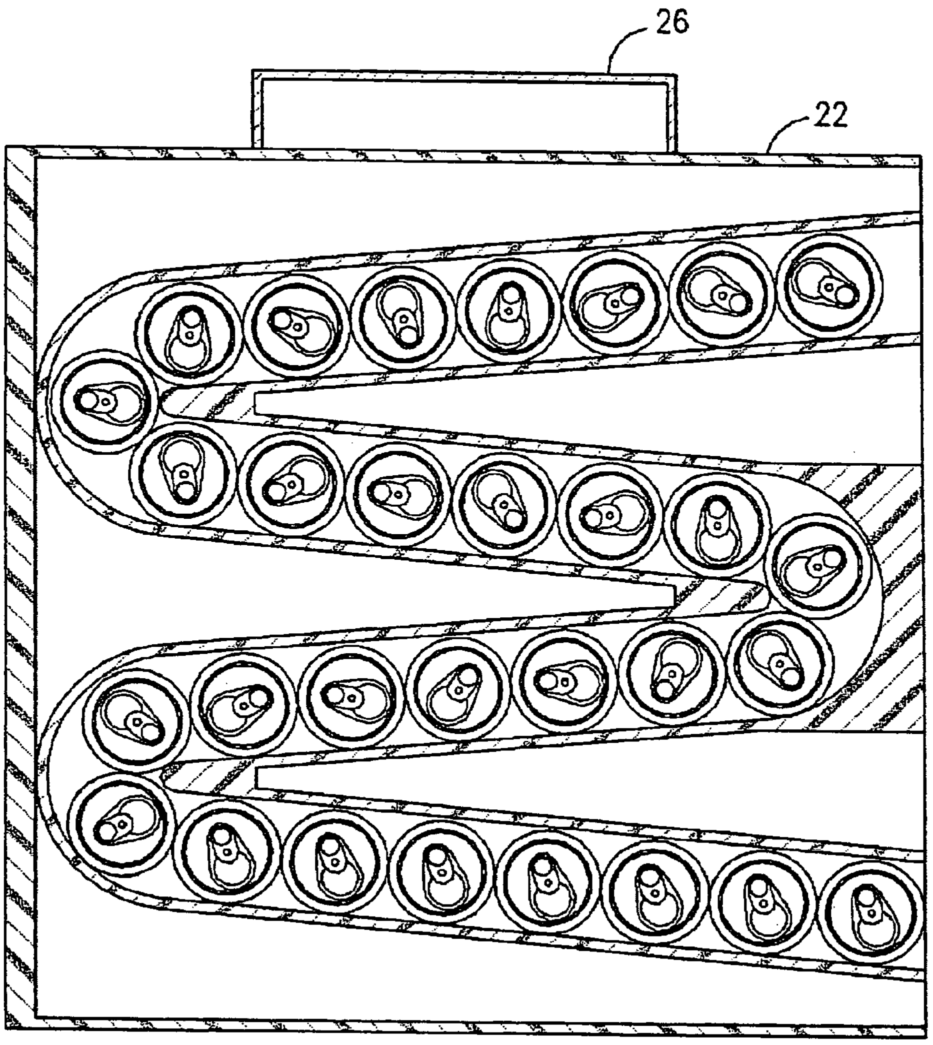
FIG. 3H depicts a portable insert with a container row arranged in a gravity fed reversing direction configuration so the items advance automatically.

FIG. 3F depicts a portable insert 22 constructed so the container rows 28 are at an angle to level such that items 30 have a natural tendency to advance by gravity. In this configuration, the contents have a tendency to advance towards the front panel 16 and the portable dispensing device 10 can be mounted on the level, instead of at an angle. FIG. 3G depicts a portable insert 22 with only two container rows 24 that are arranged in a gravity fed reversing direction configuration so the items 30 advance automatically. FIG. 3H depicts a portable insert 22 with only one container row 24 that is arranged in a gravity fed reversing direction configuration so the items 30 advance automatically. FIG. 3I depicts how a single portable insert 22 can have multiple dispensing rows 12. FIG. 3J1 to 3J6 shows one method of how a retractable stop 41 activated by the opening of a dispensing door can be employed to prevent the items from advancing into the dispensing doors until a consumer is ready to dispense an item.

Figure 4:
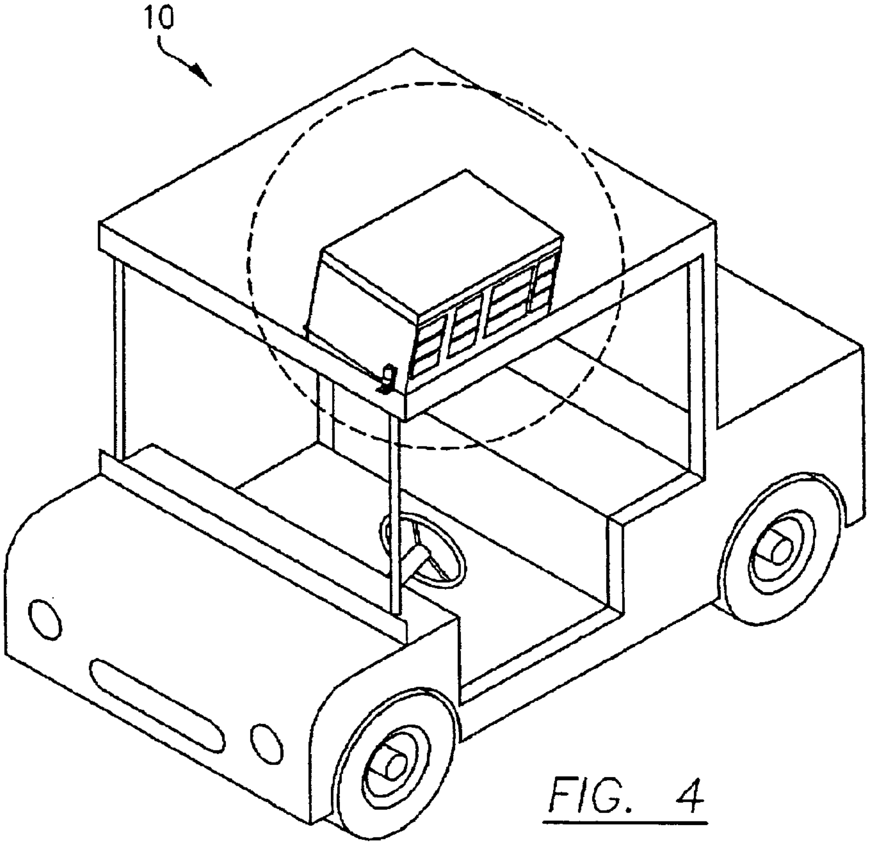
FIGS. 4 and 4A depict the mounting of the portable dispensing device on a vehicle such as a golf cart. The mounting bracket shown in FIG. 4*a* can be unlatched to allow the portable dispensing device to be tilted back and held in place prior to and while the portable inserts are removed.
Figure 4A:
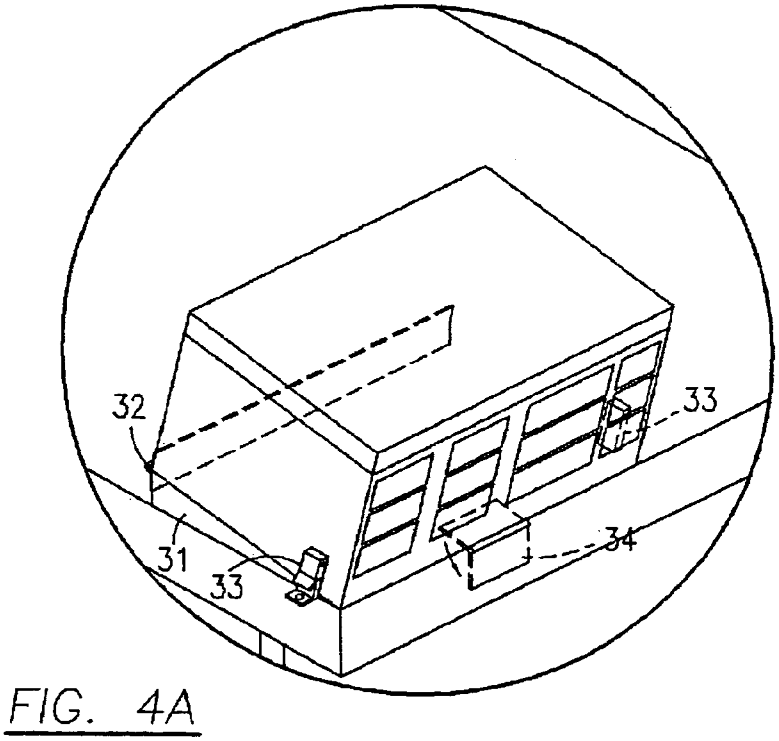

FIG. 4 depicts the portable dispensing device 10 mounted on a vehicle such as a golf cart. In FIG. 4, a mounting bracket 31 is disposed at an angle, and the items 30 inside the portable dispensing device 10 advance forward by gravity. In alternate embodiments where the container rows 24 inside the portable inserts 22 are disposed at an angle or where mechanical or other means are used to cause the items inside 30 to advance forward, the portable dispensing device 10 may be mounted on the level using a level mounting bracket (not shown), or the portable dispensing device 10 may be mounted directly to the vehicle, vessel or object without employing a mounting bracket.

FIG. 4A depicts the portable dispensing device 10 attached using a mounting bracket 31 with hinges 32, toggle latches 33 that can be unlatched to allow the portable dispensing device to be tilted back so that items inside the dispensing doors 19 will move back into their respective container rows 24 prior to removal of the portable inserts 22. A prop 34 holds the portable dispensing device in the tilted back position while the portable inserts are covered and removed from the portable dispensing device 10.

Figure 4B:
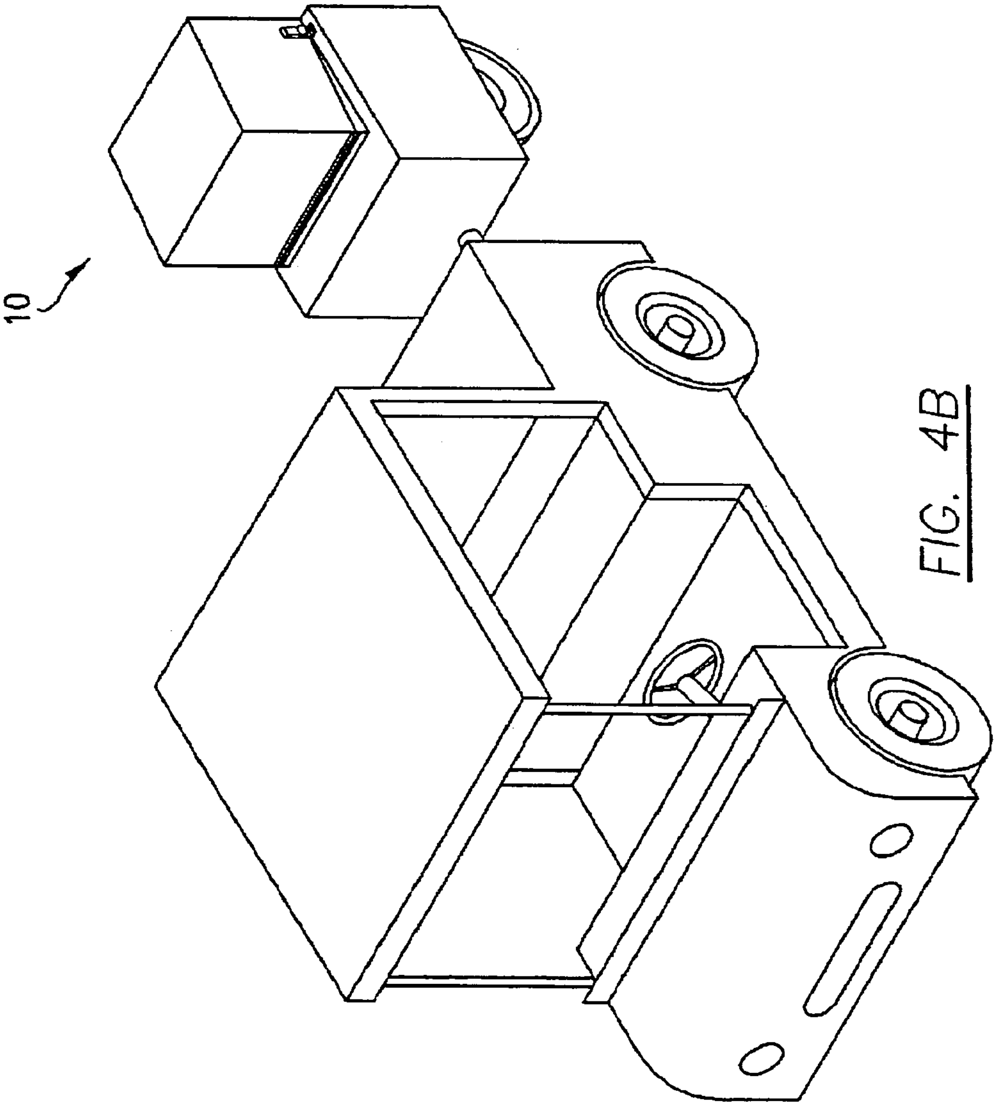
FIG. 4*b* shows the portable dispensing device attached to and being towed behind a vehicle such as a golf cart.

FIG. 4B depicts the portable dispensing device 10 attached to and towed behind a vehicle, although it could be towed along side or pushed in front of a vehicle of vessel.

FIG. 5 shows a typical front panel 16 with openings 18 and dispensing doors 19. An optional keypad 21 is connected to the metering device 20 is shown.

The preferred embodiment employs dispensing rows 22 that are fixed in the portable dispensing device 10 in position and width. Some alternate embodiments may employ dispensing rows 12 that are adjustable so that a variety of sizes of portable inserts 22 and various configurations thereof may be employed. A number of methods can be used to adjust the width and configuration of the various dispensing rows 22.

FIG. 6 depicts one method where the interior of the portable dispensing device 10 is open with no dividers 14 between the dispensing rows 12. Only portable inserts 22 are employed and can be combined in various sizes and configurations. In this particular configuration, instead of a plurality of openings 18 to correspond with the front panel 16 and dispensing doors 19, a single large opening in the front of the portable dispensing device 10 is utilized, and a variety of configurations of portable inserts can be employed just by changing the front panel 16 to one that corresponds with the desired configuration.

Figure 7:
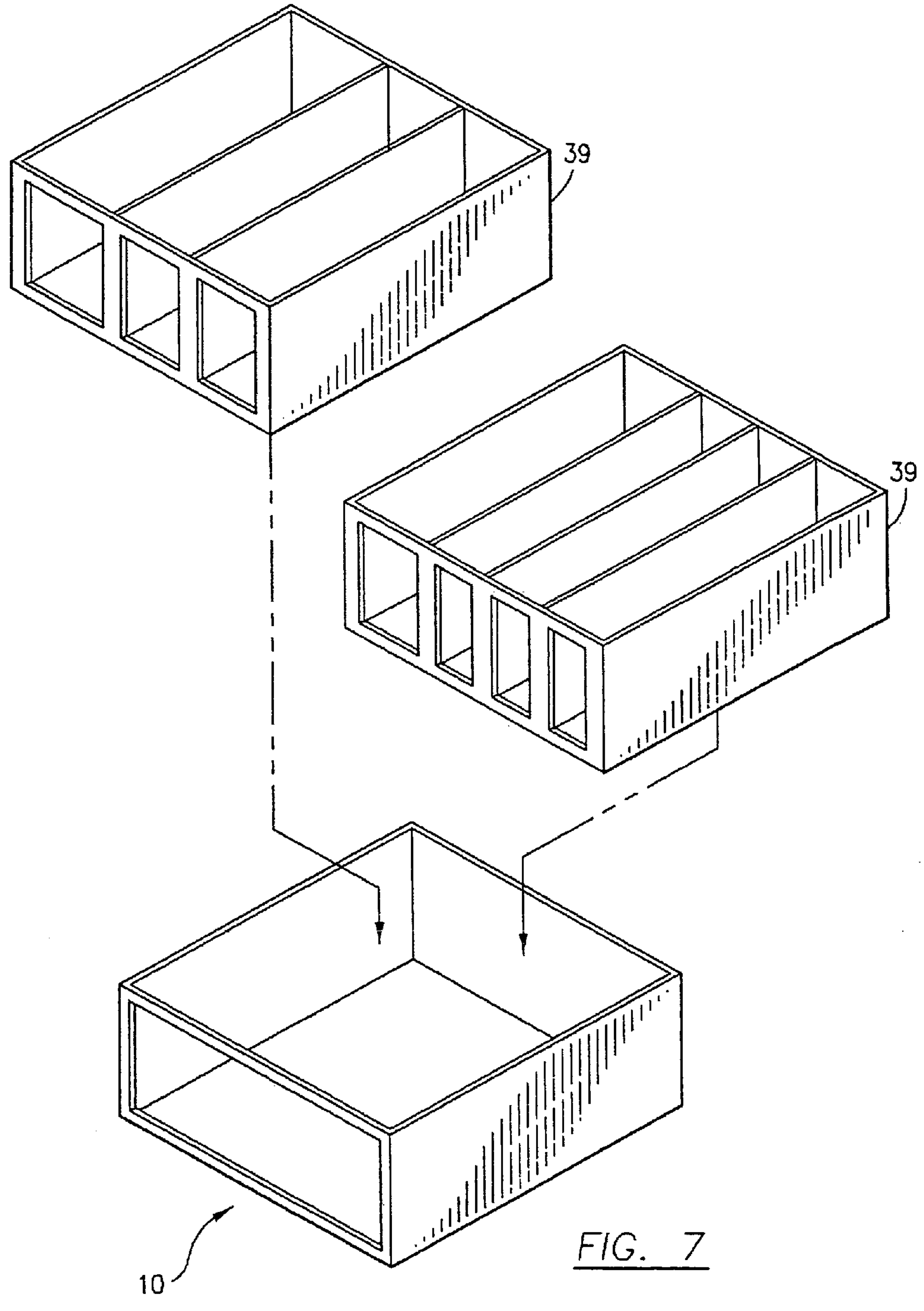
FIG. 7 depicts an alternate embodiment where the width and configuration of the dispensing rows are adjusted using portable inserts with different sized dispensing rows.

FIG. 7 shows another method for adjusting the width and configuration of the dispensing rows 12. In this embodiment, the interior of the portable dispensing device 10 is again open without any dividers 14 between the dispensing rows 12 and has a single opening to correspond with the front panel 16. Inserts 39 with the desired configuration of dispensing rows 12 are placed inside the interior of the portable dispensing device 10 and can be changed to accommodate different configurations of front panels 16.

Figure 8:
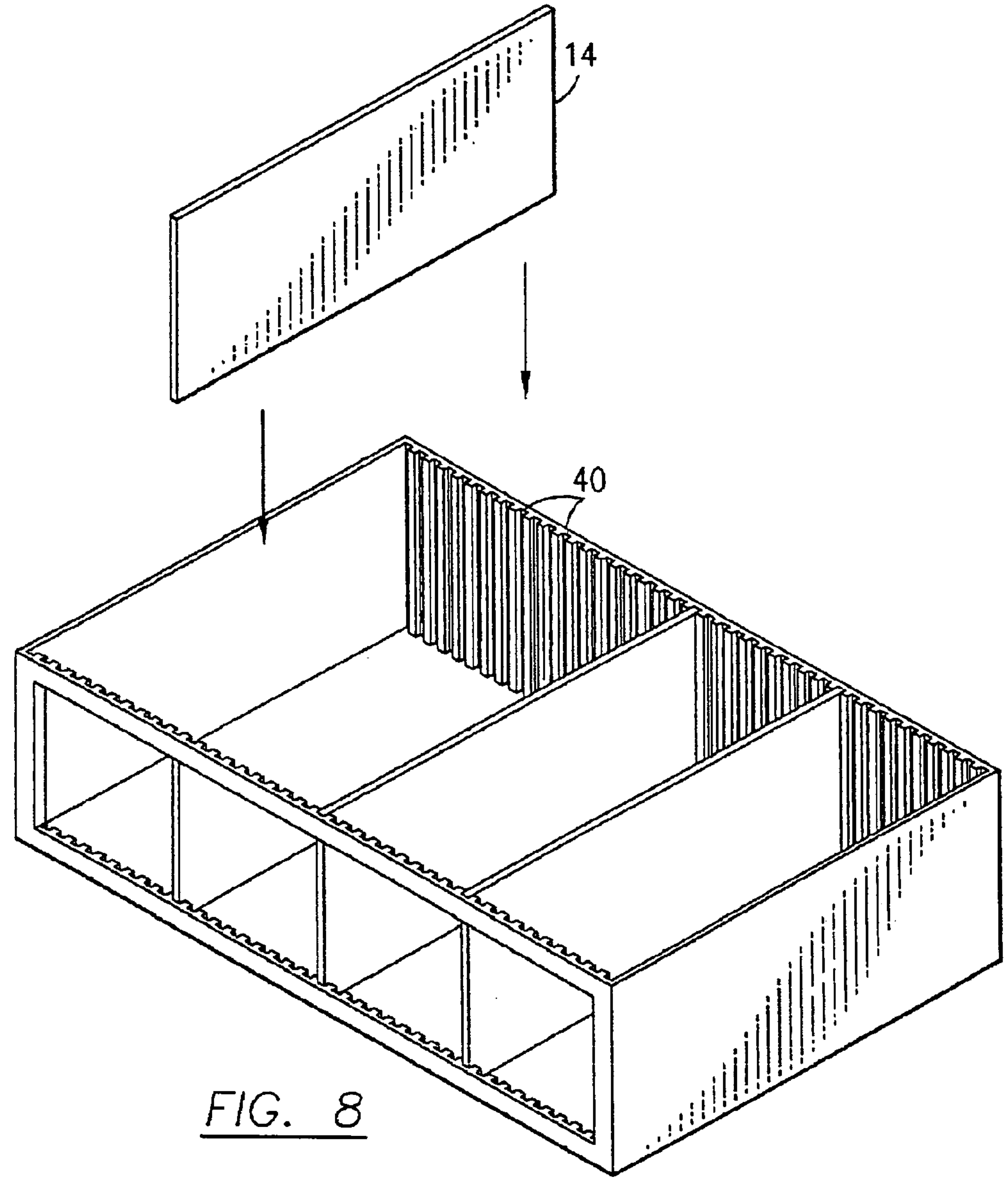
FIG. 8 shows an alternate embodiment where the width and configuration of the dispensing rows are adjusted by inserting panels into slots in desired positions within the portable dispensing device.

Yet another method for adjusting the width and configuration of the dispensing rows 12 is depicted in FIG. 8. Here, the inside walls of the portable dispensing device 10 have grooves 40 in which dividers 14 that separate the dispensing rows 12 can be placed. The width and configuration of the individual dispensing rows 12 is adjusted to correspond with the desired configuration by moving the dividers 14 to the desired slots, and employing a front panel 16 with the desired configuration. The methods shown for adjusting the width and configuration of dispensing rows 12 is not intended to be limiting, the object of the invention being that the dispensing rows 12 can either be fixed in width and configuration or adjustable in width and configuration.

Figure 9:
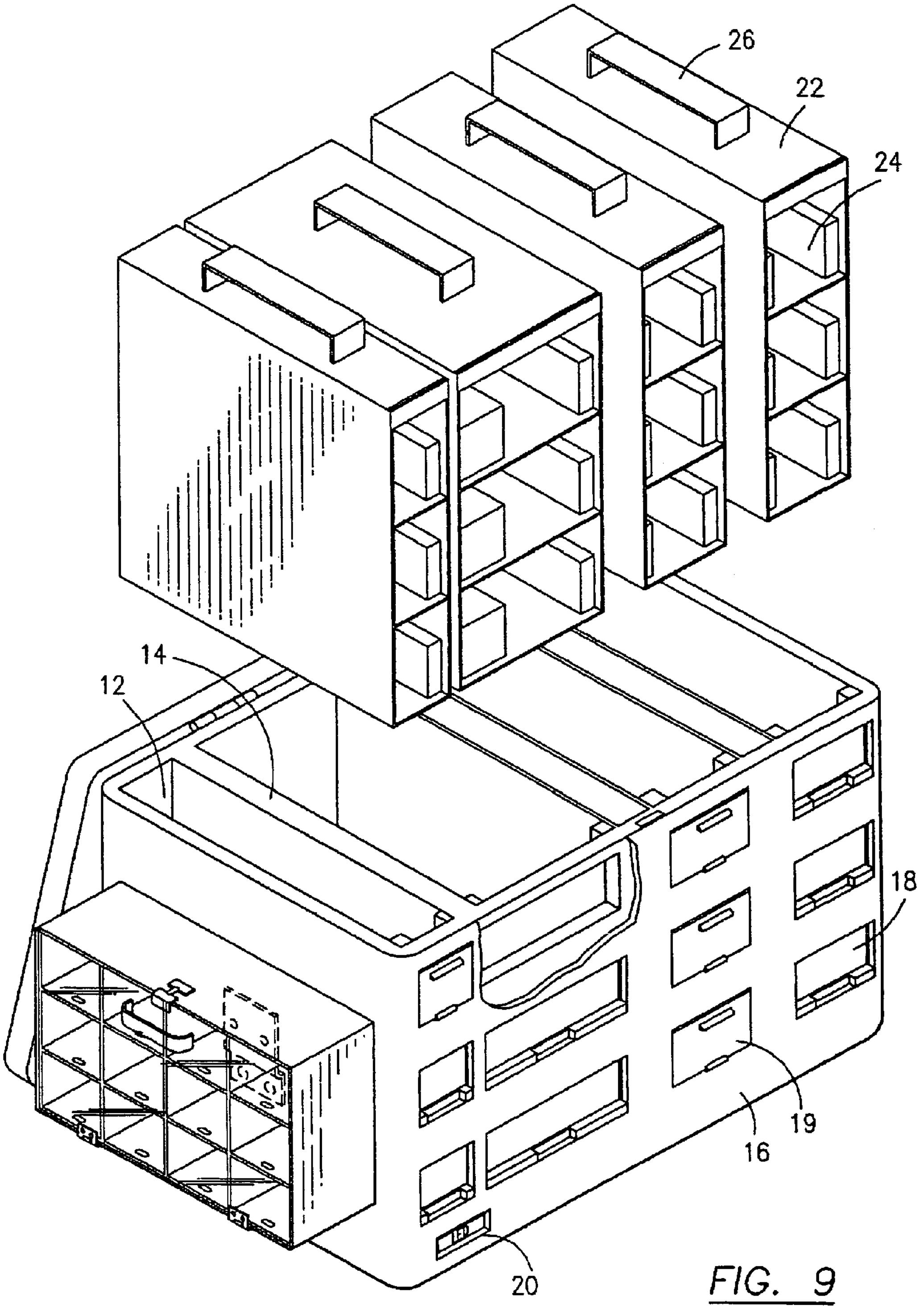
FIG. 9 shows an alternate embodiment where the dispensing doors, wiring and metering device are built into the housing of the portable dispensing device.

FIG. 9 shows an alternate embodiment where the dispensing doors 19, metering device 20 and wiring are built into the body 10 of the portable dispensing device 10.

Figure 10:
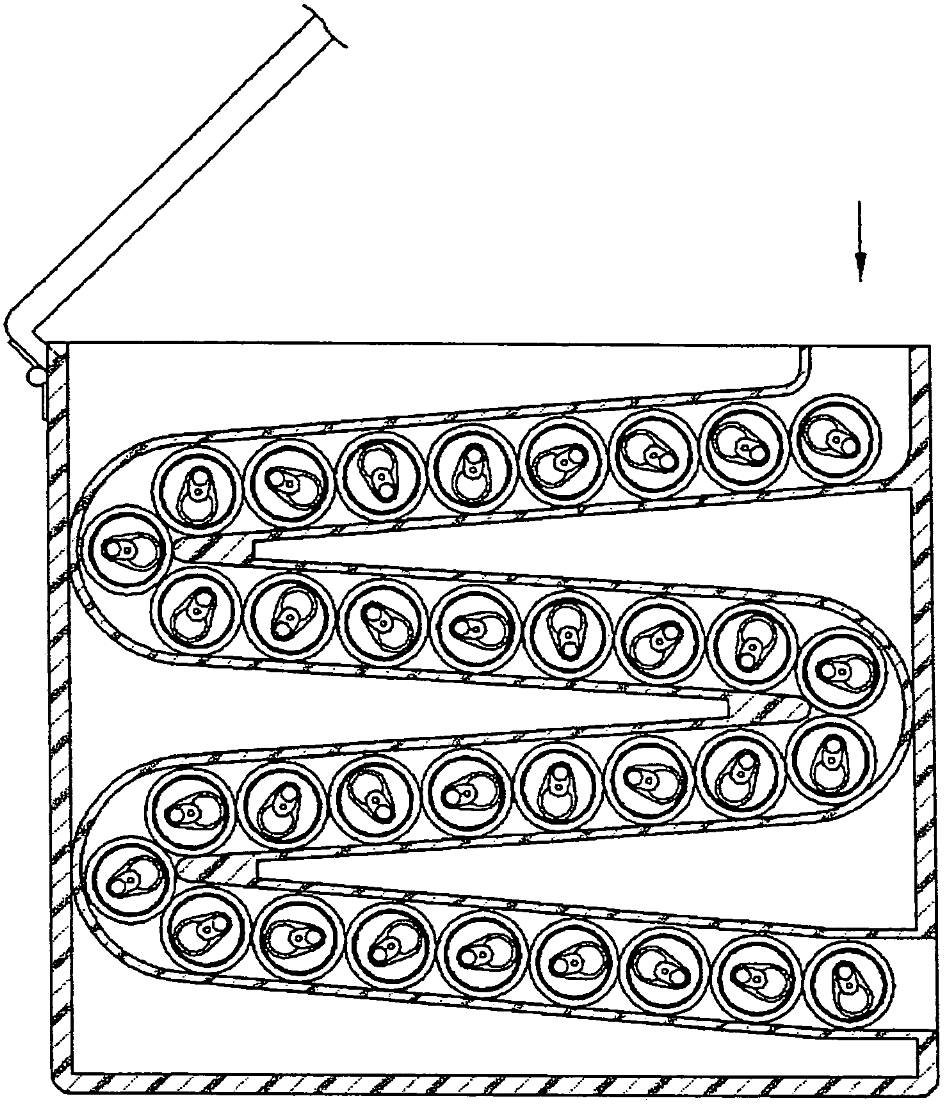
FIG. 10 shows an alternate embodiment that does not utilize portable inserts, but rather items are loaded directly into the portable dispensing device through the top cover.

FIG. 10 shows an alternate embodiment with the dispensing rows 12 designed to accept and dispense the items 30 directly.

Figure 11:
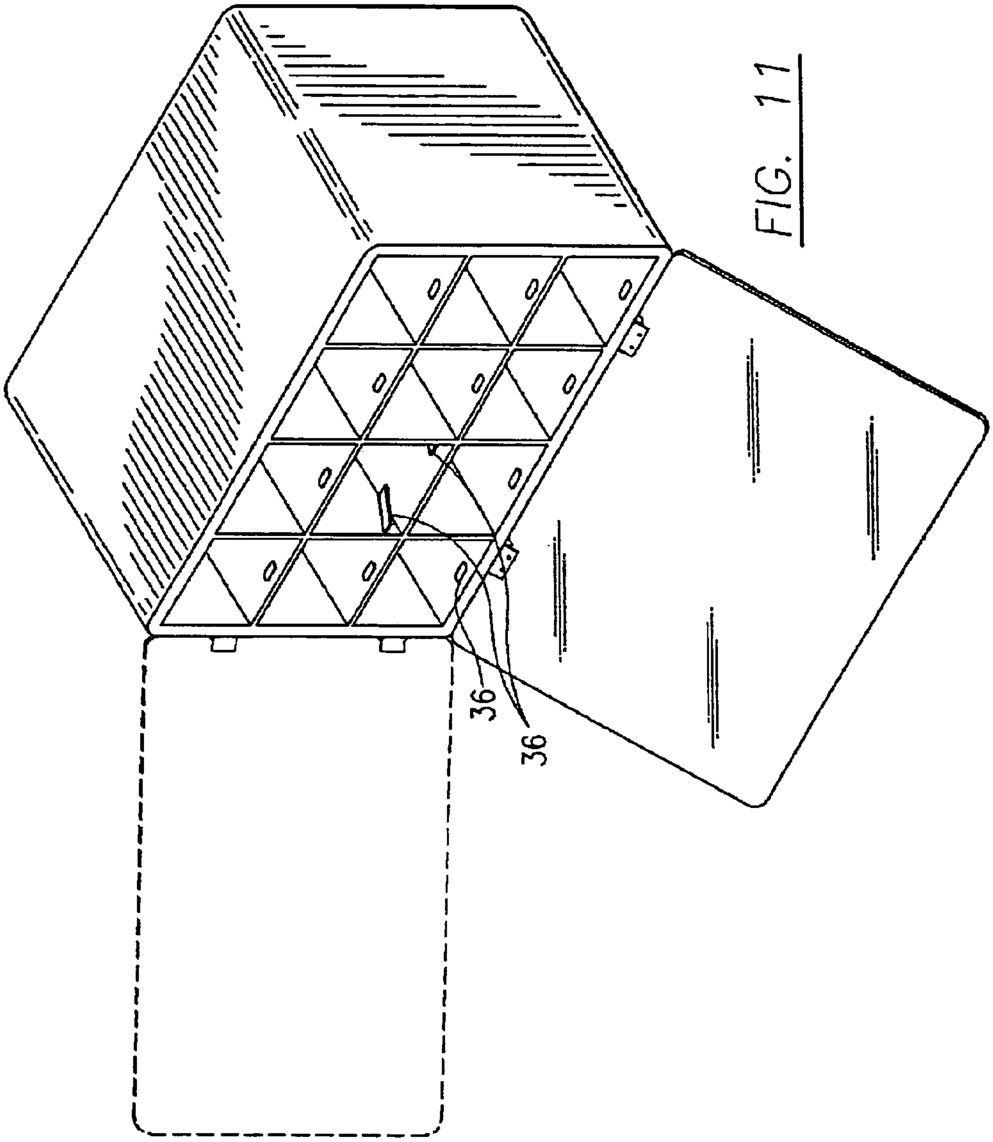
FIG. 11 shows an alternate embodiment with no dispensing doors or portable inserts.

FIG. 11 shows an alternate embodiment where there are no dispensing doors 19 or portable inserts 22, and access to the inside of the portable dispensing device 10 is through a single front panel 16*a*. Items 30 are loaded directly into the dispensing rows 12 through the single front panel 16*a* which opens to give the consumer direct access to the items 30 inside. A sensor located at the front of each dispensing row 12 connected to the metering device 20 detects and records when an item 30 has been removed.

Figure 12:
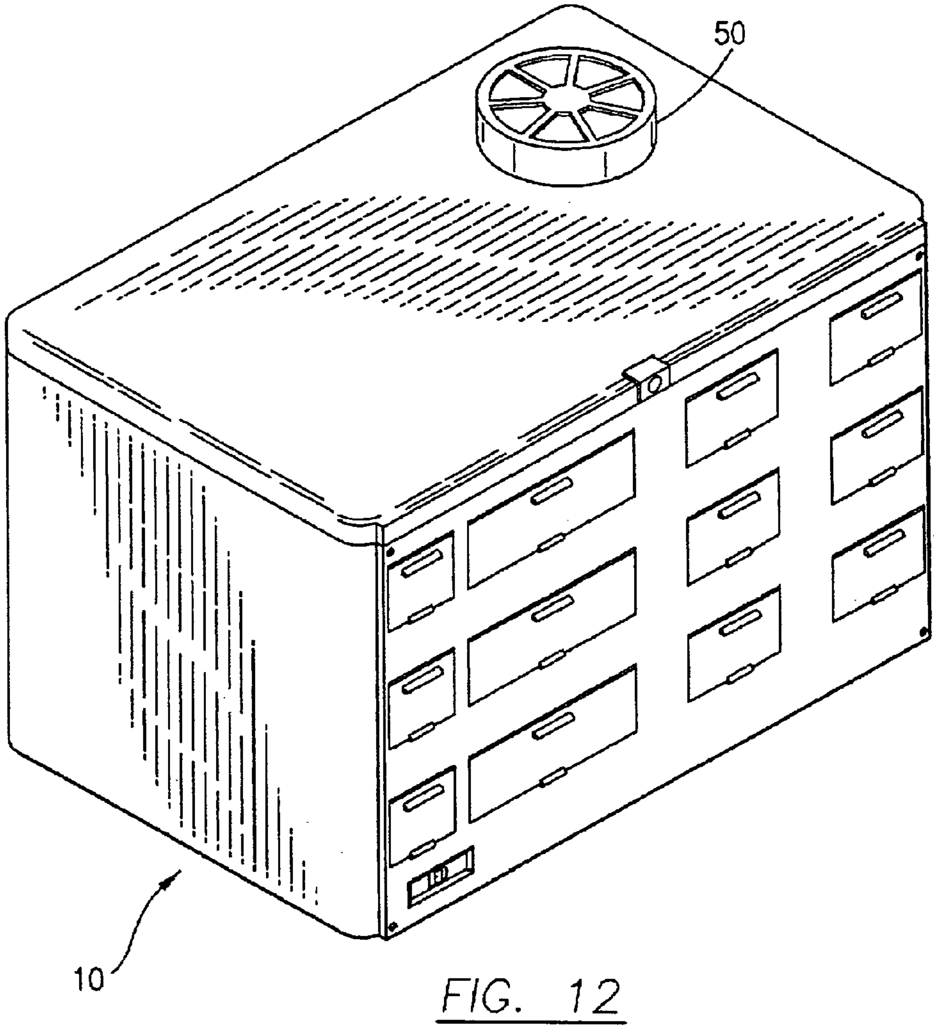
FIG. 12 is a depiction of the preferred embodiment with an electrically powered cooling device.

FIG. 12 is a depiction of the preferred embodiment with an electrically powered cooling device 50. In this case, the cooling device 50 is mounted within the top cover 15, but it could be mounted anywhere within the portable dispensing device 10. A heating device can also be employed in place of a cooling device 50, or both a cooling and heating device can be employed if appropriate insulation is placed between the various dispensing rows 12 containing cold and hot items.

Figure 13:
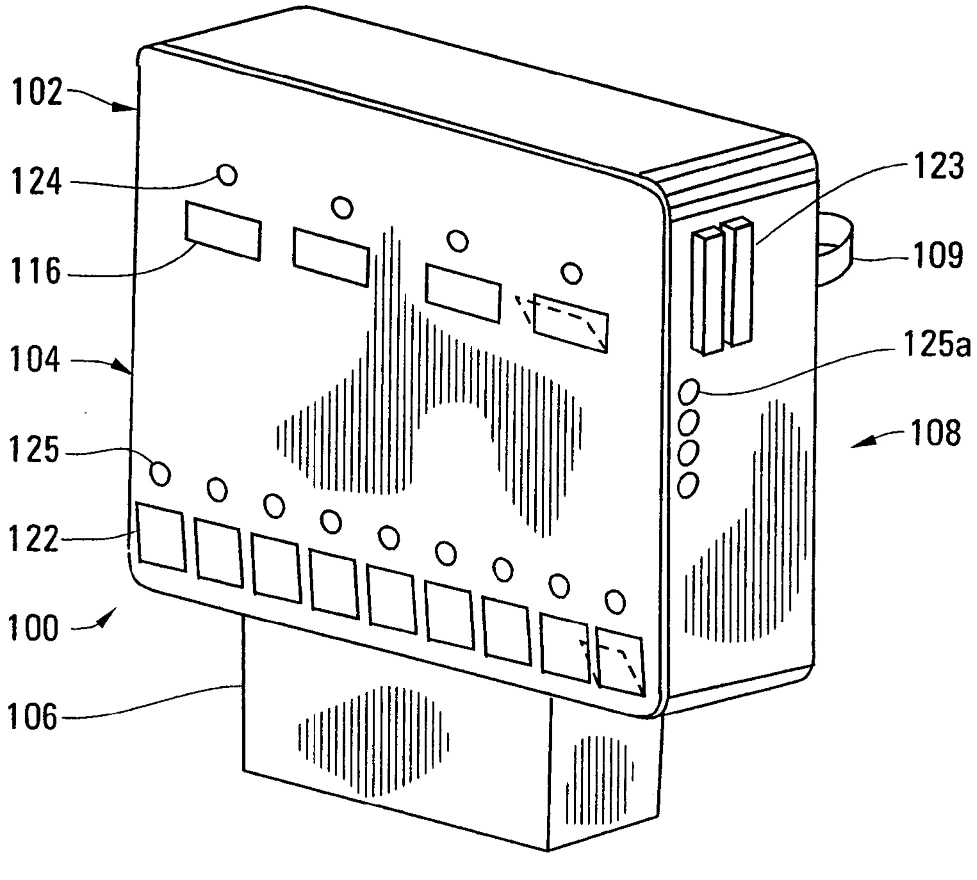
FIG. 13 is a perspective view of a vending machine built in accordance with one embodiment of the invention, showing an exterior thereof
Figure 14:
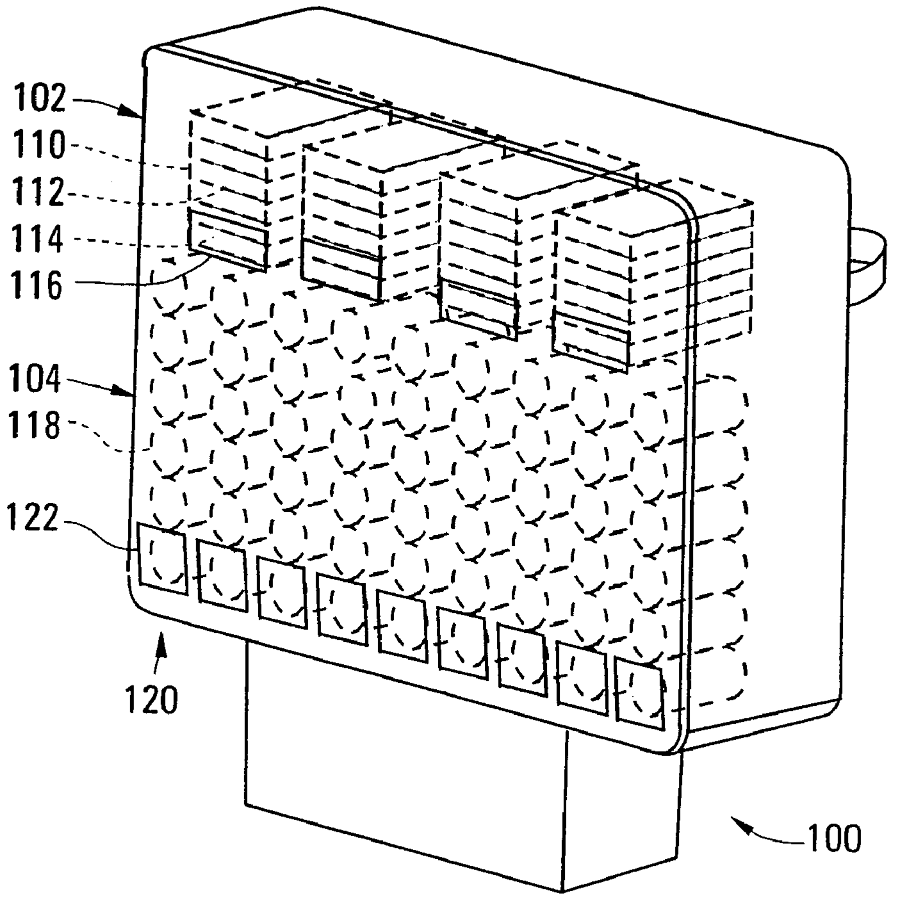
FIG. 14 is a perspective view of the vending machine of FIG. 13, showing an arrangement of products therein.

General features of a vending machine 100 built in accordance with an alternate version of the invention will first be discussed with reference being made to FIGS. 13 and 14, which are both perspective views of the vending machine 100. FIG. 13 shows external features of the vending machine 100, while FIG. 14 shows the general organization of products held within the vending machine 100.

The vending machine 100 includes an upper snack-holding portion 102, an intermediate beverage-holding portion 104, and a lower refrigeration portion 106, which fits within the basket (not shown) of a golf cart. The snack-holding portion 102 and the beverage-holding portion 104 occupy a common cabinet 108 being separated by an insulating wall (not shown), allowing a refrigeration mechanism (not shown) within the refrigeration portion 106 to refrigerate the beverage-holding portion 104 without refrigerating the snack-holding portion 106. The cabinet 104 is disposed above the basket within the golf cart, being provided with a pair of belts 109 for fastening the vending machine to a framework structure (not shown) supporting the roof of the golf cart. Within the snack-holding portion 102, snacks are held in four snack-holding bins 110, with similar snacks being stored in a single bin 110, separated from one another by sliding platforms 112. When a sliding platform 112 is pulled away, the snack product resting atop the sliding platform 112 is released to fall downward into a lowest position 114 within the bin 108, to be retrieved by the user through a door 116. Within the beverage-holding portion 104, cans 118 are preferably stored in columns 120 to be retrieved through doors 122. In this embodiment, nine columns are depicted, however, any suitable number of columns is considered within the scope of the present invention.

Exterior features of the vending machine 100 include a magnetic card reader 123, through which a magnetic card (not shown) is slid to pay for a selected product, a button 124 associated with each door 116 for selecting the snack product accessed through the door 116, and a button 125 associated with each door 122 for selecting the beverage product accessed through the door 122. A number of display areas 125*a* are individually illuminated during the use of the vending machine 100 to provide messages for the user.

Figure 15:
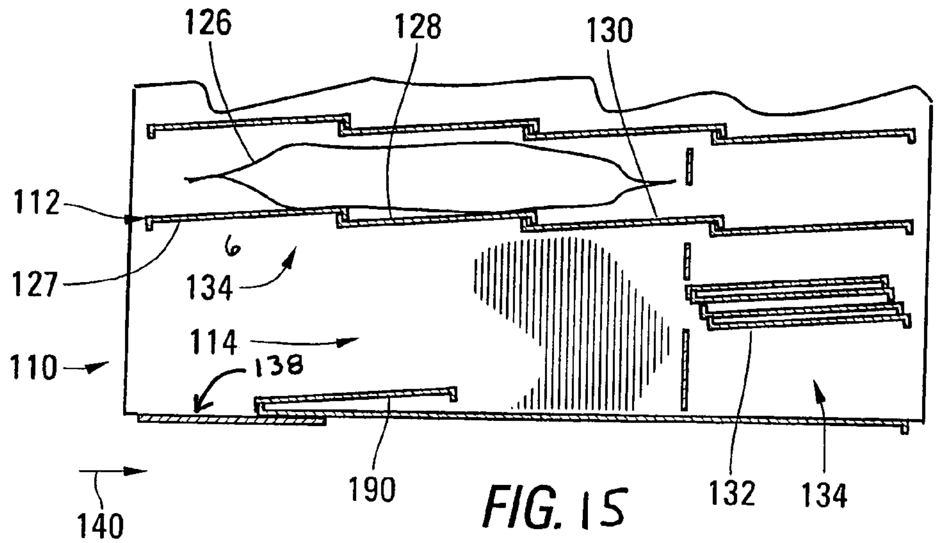
FIG. 15 is a fragmentary cross-sectional side elevation of a snack holding bin within the vending machine of FIG. 13.

FIG. 15 is a fragmentary cross-sectional side elevation of one of the snack-holding bins 110, showing a number of sliding platforms 112 supporting individual snack products 126. Each of the sliding platforms 112 comprises an outer platform section 127, an intermediate platform section 128, and an inner platform section 130, which are mounted to slide along one another in a telescoping fashion, moving into a stacked configuration 132 within a rear storage area 134. Each of the sliding platforms 112 is arranged to move between an extended configuration 136, supporting a snack package 126, and the stacked configuration 132, allowing the snack package 126 to fall to a floor 138 of the bin 110, in response to inward movement, in the direction of arrow 140, of the outer platform section 127.

A platform release mechanism 142, providing movement of each of the outer platform sections 127 in the direction of arrow 140 will now be discussed, with reference being made to FIGS. 16 and 17. FIG. 4 is a side elevation of the snack-holding bin 110, while FIG. 17 is a fragmentary cross-sectional plan view of the bin 110, taken as indicated by section lines 5-5 in FIG. 16 to show the mechanism 142.

Each of the snack-holding bins 110 includes a solenoid 144, which is actuated by an electrical pulse in response to a selection of the product using buttons 124 or 125 within the bin 110. The solenoid 144 pulls a crank 146, causing a torque bar 148 to pivot in the direction of arrow 150. The platform release mechanism 142 includes a crank 152, pivoted at a pin 154, which slides vertically, in the direction of arrow 156, along the torque bar 142. The pivoting movement of the torque bar 148 in the direction of arrow 150 is transmitted through the crank 152 to pivot a platform latching pawl 158 in the direction of arrow 160, releasing a pin 162 mounted on a tab 164 extending outward, in the direction of arrow 166, as a portion of the outer platform section 127. The platform latching pawl 158 is pivotally mounted by a pin 166 on a bracket 168 extending outward from a side plate 170 of the bin 110, with the pawl 158 being held in the latching position shown by a spring 171 connected to the bracket 168. When the pin 162 is thus released by movement of the platform latching pawl 158, the outer platform section 127 moves in the direction of arrow 140, being pulled by an extension spring 172, so that the sliding platform 112 is collapsed into the stacked position 136, with the tab 164 of the outer platform section 127 sliding within a slot 174 of the side plate 170.

The pin 154 pivotally attaches the crank 152 to a sliding block 176, which slides vertically along a pair of shafts 178, being pulled by a cable 180. The cable 180 extends around four idler pulleys 182, being additionally attached to a slider 184, sliding vertically in a slot (not shown) within a rear plate 186 of the bin 110. The slider 184 is further attached to an extension spring 188, which pulls the slider 184 downward and the sliding block 176 upward, As shown in FIG. 17, the upward pull of the cable 180 on the sliding block 176 holds the sliding block 176 in place under the tab 164 of the outer platform section 127, with the crank 152 being held in alignment with the latching pawl 158. When the outer platform section 127 moves in the direction of arrow 140 after the pin 162 is released from the latching pawl 158, the sliding block 176 moves upward, being pulled by the extension spring 188 through the cable 180, to rest under the tab 164 of the next, upwardly adjacent outer platform section 127. In this way, each time the solenoid 144 is pulsed following a selection by the user of a snack product 126, the sliding platform 112 holding the snack product 126 moves into the stacked position 136, allowing the product 126 to fall downward to the floor 138 of the bin 110, into a position 114 in which it can be removed by the user.

Preferably, the snack-holding bin 110 is initially loaded with a snack product 126 in the lowest position 114, on the floor 138, as well as on each of the sliding platforms 112, with the bin 110 being additionally provided with a latching plate 190, having a tab 164 beneath which the sliding block 176 is initially held, with the latching plate 190 being held in place by a pin 162. Then, when the snack product 126 is initially selected, the solenoid 144 causes the latching plate 190 to be released to move in the direction of arrow 140, releasing the sliding block 176 to move upward, into position under the tab 164 of the lowermost outer platform section 127.

Figure 16:
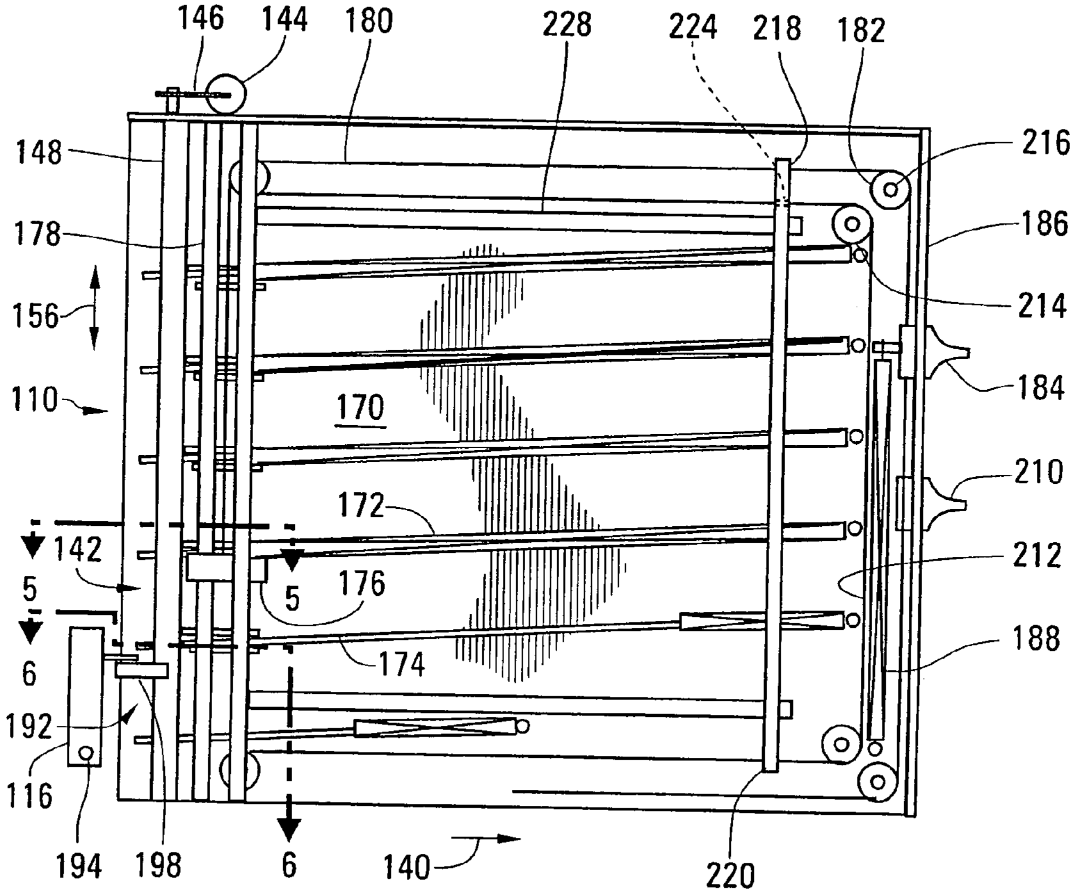
FIG. 16 is a side elevation of the snack-holding bin of FIG. 15.
Figure 17:
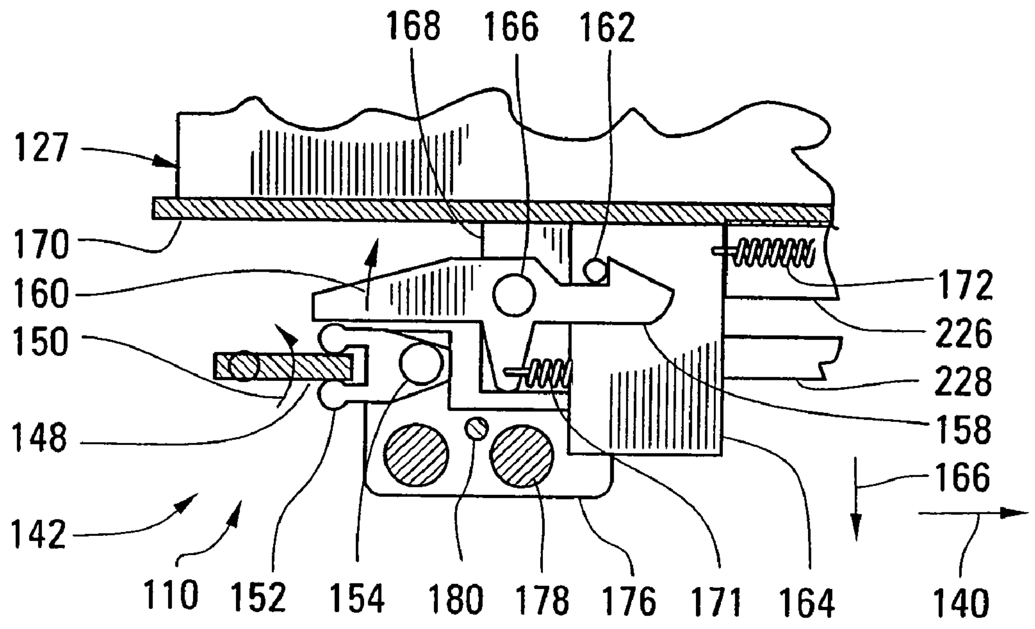
FIG. 17 is a fragmentary cross-sectional plan view of the snack-holding bin of FIG. 15, taken as indicated by section lines 5-5 in FIG. 16 to show a mechanism for selectively releasing a sliding platform.
Figure 18:
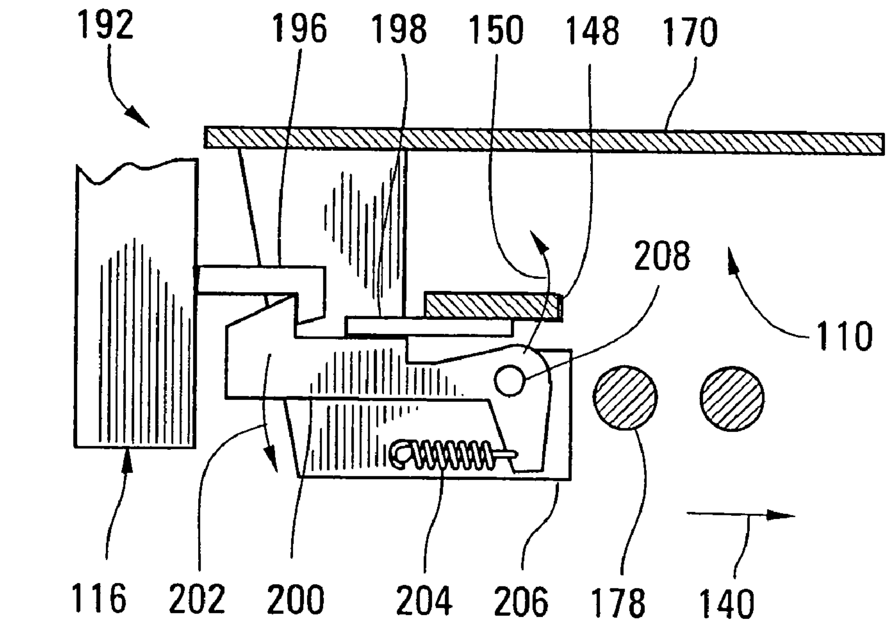
FIG. 18 is a fragmentary cross-sectional plan view of the snack-holding bin of FIG. 16, taken as indicated by section lines 6-6 in FIG. 16 to show a mechanism for selectively releasing an access door.

FIG. 18 is a fragmentary cross-sectional plan view of the snack-holding bin 110, taken as indicated by section lines 6-6 in FIG. 16 to show a mechanism 192 for releasing door 116 associated with the bin 110 with the pivoting movement of the torque bar 148 in response to the solenoid 144. The door 116, which is pivotally mounted on a pin 194, includes a latching portion 196, through which the door 116 is held in a closed position. When the solenoid 144 is actuated, pivoting movement of the torque bar 148 in the direction of arrow 150 causes a tab 198 attached to the torque bar 148 to release a latching pawl 200 to pivot outward, in the direction of arrow 202, releasing the door 116 to be opened outward, opposite the direction of arrow 140, through a short pivoting movement by a spring (not shown) and allowing the door 116 to then be fully opened by the user. The latching pawl 200 is otherwise held in the latching position, in which it is shown, by a spring 204, with the latching pawl 200 being pivotally attached to a bracket 206, extending from the side plate 170, by pin 208.

After the golf cart (not shown) is returned, a rear cover (also not shown) of the cabinet 106 is opened, so that the snack products 126 that have been purchased and removed can be replaced. The process of refilling a snack-holding bin 110 from which snack products 126 have been removed includes resetting the sliding platforms 112 and the sliding block 176 to their initial positions. First, the slider 184 is moved upward to move the sliding block 178 downward, into its lowest position. Then, with the slider 184 being held upward, a second slider 210 is also moved upward to move the latching plate 190 and each of the outer platform sections 127 that has been moved into the stacked position 134 opposite the direction of arrow 140. The second slider 210 is attached to a cable 212, which extends over pulleys 214 and over pulleys sharing pins 216 with the pulleys 182 engaging the cable 180. An upper end 218 and a lower end 220 of a rod 222 are attached to the cable 212, with the cable 212 additionally sliding through a clearance hole 224 within the rod 222, so that the rod 222 is moved opposite the direction of arrow 140 as the second slider 210 is moved upward. The rod 222 slides in a slot 226 within each of a pair of guide bars 228 attached to the side plate 170.

Figure 19:
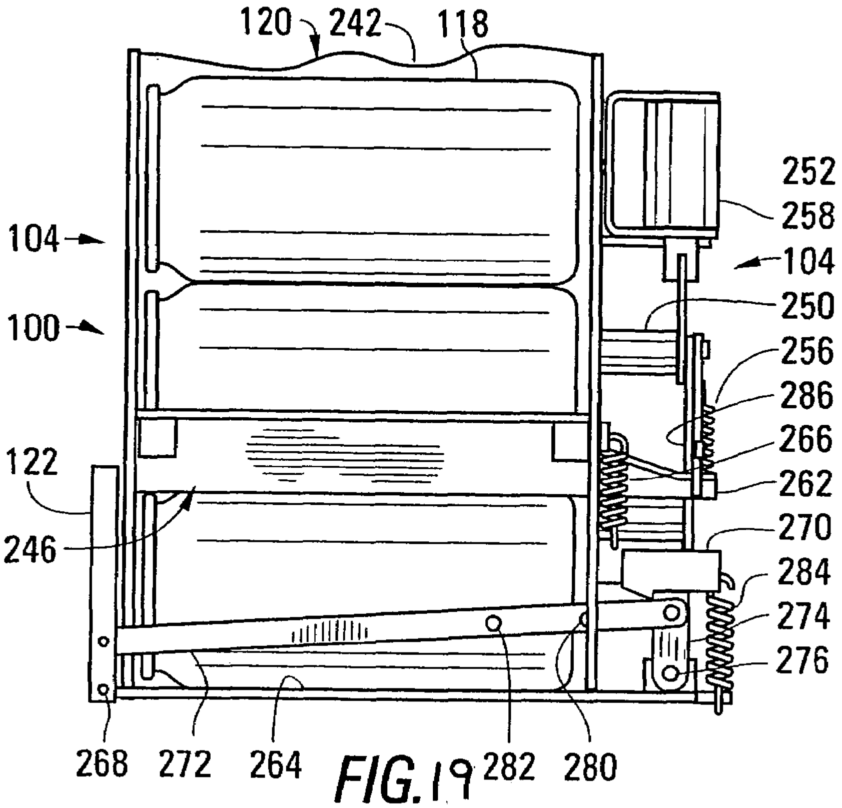
FIG. 19 is a fragmentary cross-sectional side elevation of a beverage holding portion of the vending machine of FIG. 13.
Figure 20:
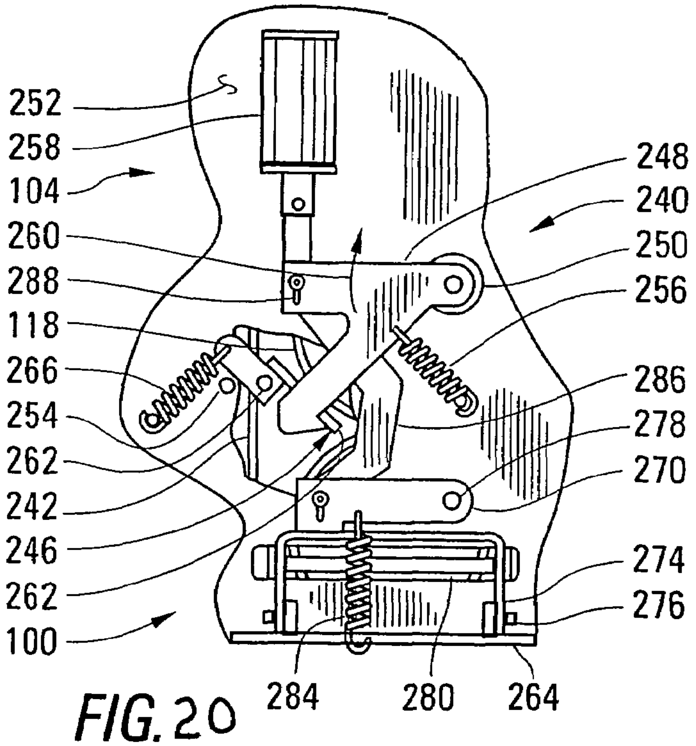
FIG. 20 is a fragmentary rear elevation of the beverage-holding portion of the vending machine of FIG. 13.

A mechanism 240 for selectively releasing an individual can 118 stored within the beverage-holding portion 104 of the vending machine 100 will now be discussed, with reference being made to FIGS. 19 and 20. FIG. 19 is a fragmentary cross-sectional side elevation of the beverage-holding portion 104, while FIG. 20 is a fragmentary rear elevation thereof.

Within the beverage-holding portion 104, cans 118 are stacked in columns 120, which are separated from one another by vertical partitions 242. A downward flow of the cans 118 within each column 120 is prevented by a gate 246, which is held in a closed position by an latching pawl 248. The latching pawl 248, which is pivotally mounted on a stand-off 250 extending from a rear plate 252 of the beverage holding portion 104, is held against a stop 254 by a spring 256. The can-releasing mechanism 210 includes a solenoid 258, which is actuated by an electrical pulse in response to the selection of a beverage product by the user. Actuating the solenoid 258 causes the latching pawl 248 to pivot in the direction of arrow 260, releasing a tab 262 to allow the gate 246 to pivot downward about a pivot pin 262 under the weight of one or more cans 118 resting atop the gate 246. After the can 118 moves past the gate 246 to rest on a floor 264 of the beverage-holding portion 104, a restoring spring 266 moves the gate 246 to its latched position, so that additional cans 118 are retained above the gate 246.

A can 118 resting on the floor 264 is accessed through the door 122, which is pivotally mounted by a pin 268, and which is held In a closed position by a latching pawl 270 until the solenoid 258 is actuated. A link 272 extending along each side of a can 118 resting on the floor 264 moves a U-shaped crank 274, pivotally mounted by pins 276 with the door 122, with movement to open the door being prevented by engagement of the crank 274 with the pawl 270. When the solenoid 258 is actuated, latching pawl is pulled upward, pivoting about a pin 278, allowing the door 122 to be pivoted open through a short distance by a spring (not shown), and allowing the door 122 to then further opened by the user. A pin 280 is optionally included to assist in the removal of a can 118 resting on the floor 264 through movement of the links 272, between which the pin 280 extends, as the door 122 is opened. Additional holes 282 are optionally provided within the links 272 for use with shorter cans.

When the user closes the door 122, the crank 274 and the pawl 270 are returned to their original positions, with the pawl 270 being pulled into position by a spring 284. While the latching pawls 248, 274 are moved together by a link 286 connected to the solenoid 258 when the solenoid 258 is actuated, slots 288 within the latching pawls 248, 274 allow these pawls to be restored at different times without interaction.

Preferably, the columns 120 of cans 118 are refilled by loading cans from the rear of the position within each column 120, with the gate 246 being held open so that one can 118 moves into the lowest position to rest against the floor 254. When this lowest can 118 is selected by the user, the gate 246 is released by the solenoid 258 and held closed by the spring 266 without opening, since the weight of the can 118 above the gate does not open the gate 246, with this can 118 being instead supported by the can 118 below it, resting on the floor 254 before this lowest can 118 is removed by the user.

Figure 21A:
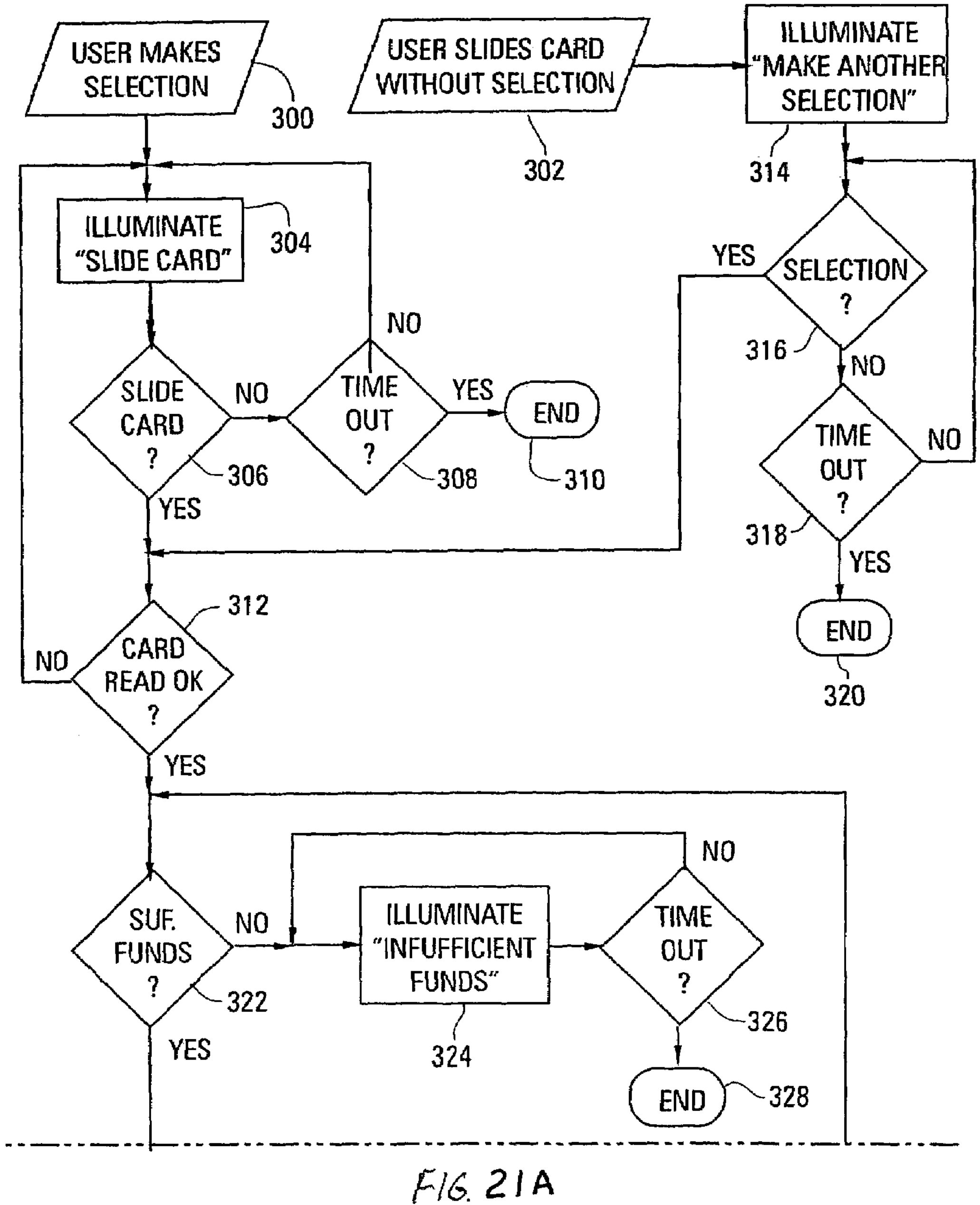
FIGS. 21A and 21B are schematic views of operations occurring within the vending machine of FIG. 13 including an upper portion, indicated as FIG. 21A, and a lower portion, indicated as FIG. 21B.
Figure 21B:
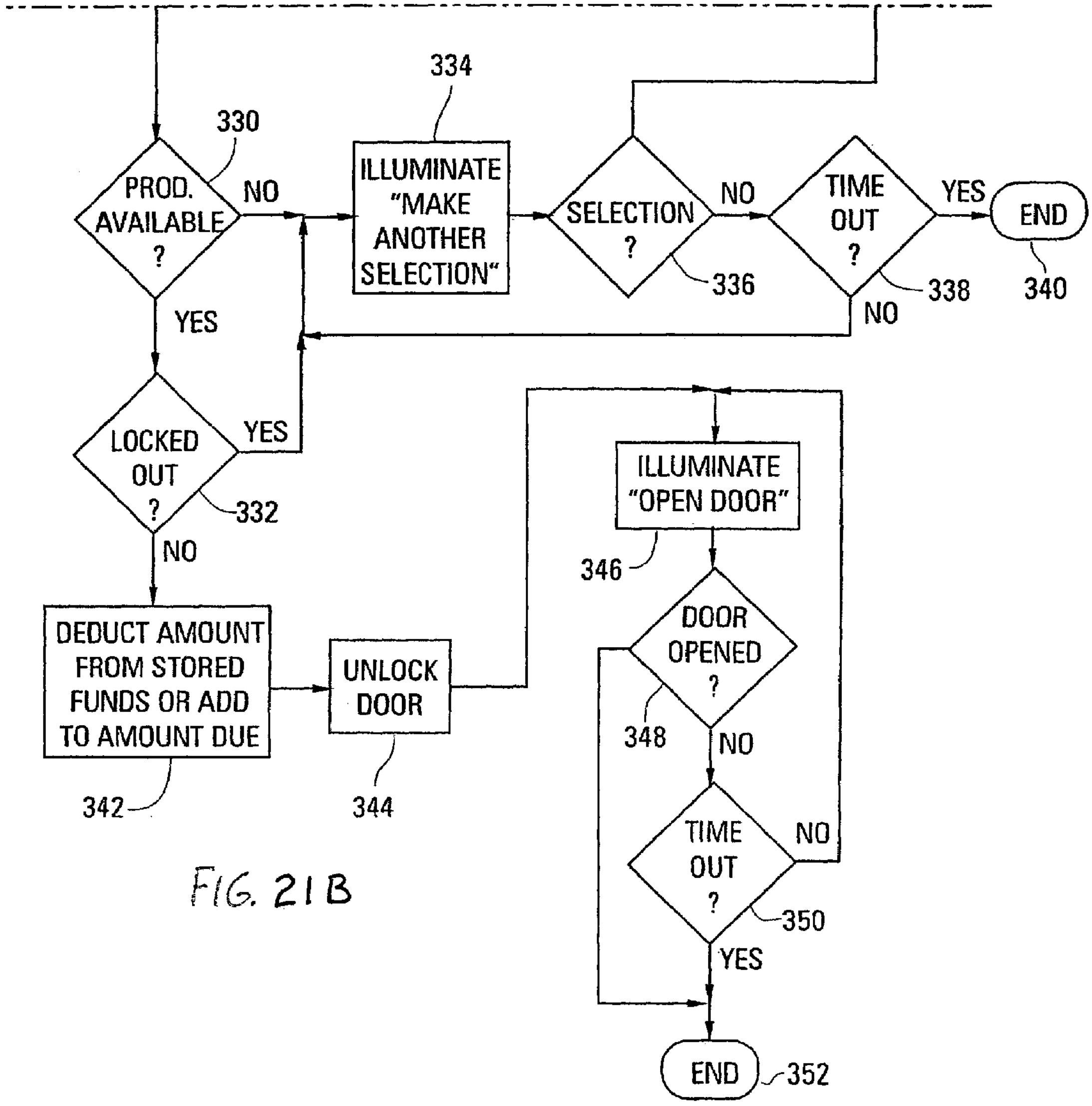

FIGS. 21A and 21B comprise a schematic view of operations occurring within the vending machine 100. FIG. 21 includes an upper portion, indicated as FIG. 21A, and a lower portion, indicated as FIG. 21B. These operations, which occur under control of a microprocessor executing instructions of a computer program, begin either in step 300, when the user makes a selection buttons 124,125 or in step 302, when the user slides a magnetic card through the card reader 123. Preferably, such a magnetic card is a type provided to the user for use within the vending machine 100. In one version of the invention, the magnetic card is purchased from a concession operation when the golf cart is rented, with the amount of the purchase being written to data storage within the vending machine 100. In a second version of the invention, the magnetic card is given to the user, with the accumulated value of the purchases from the vending machine 100 being stored in data storage within the vending machine 100 for later billing to the user.

After starting in step 300, the system illuminates an indicator 125*a* in step 304 to indicate that the used should slide the card and proceeds to step 306 to wait for the user to slide the magnetic card or for a time out condition to occur, as determined in step 308, If the time out condition occurs before the card is slid, the process ends in step 310. Otherwise, after it is determined in step 306 that the card has been slid, the system proceeds to step 312 to determine if the card has been read properly.

After starting in step 302, the system illuminates an indicator 125*a* in step 314 to indicate that a selection should be made and proceeds to step 316 to wait for the user to make a selection or for a time out condition to occur. If it is determined in step 318 that the time out condition has occurred before a selection has been made, the process ends in step 320. Otherwise, after it is determined in step 316 that a selection has been made, the system proceeds to step 312 to determine if the card has been read correctly in step 302.

In either case, if it is determined in step 312 that the card has not been read properly, the system proceeds to step 304 to illuminate an indicator 125*a* indicating that the card should be slid again, If it is determined in step 316 that the card has been read properly, the system proceeds to step 322 to determine if sufficient funds are available. If the system is operating according to the second version of the invention, charges will be accumulated for billing, so the funds are considered to be available. If the system is operating according to the first version of the invention, an amount of funds stored in data storage is checked. If funds are determined not to be available, an indicator 125*a* is illuminated in step 324 until it is determined in step 326 that a time out condition has been reached, causing the process to end in step 328.

If it is determined in step 322 that sufficient funds are available, the system proceeds to step 320 to determine if the selected product is available within the vending machine 100. This may be done by checking inventory information in data storage within the vending machine 100 or by checking switches operated within the vending machine 100 to indicate the presence of the product. If the product is determined to be available, a further determination is made in step 332 of whether the chosen product has been locked out to keep minors renting the golf cart from purchasing an alcoholic beverage. If it is determined in steps 330, 332 that the product is not available or that product has been locked out, an indicator 125*a* is illuminated in step 334 to indicate that another selection should be made. Then, if it determined in step 336 that another selection has been made before it is determined in step 338 that a time out condition has been reached, the system returns to 322 to consider the sufficiency of funds for the new selection. If it is determined in step 338 that the time out condition has been reached, the process ends in step 340.

If it is determined in steps 330, 332 that the selected product is available and not locked out, in step 342 the cost of the product is deducted from stored fund information with the system operating in accordance with the first version of the invention or added to accumulating fund information with the system operating in accordance with the second version of the invention. Then, in step 344, the solenoid 144, 258 is operated, unlocking the door associated with the product and feeding the product as described above, with an indicator 125*a* being illuminated in step 346 to indicate that the door should be opened. Then, when the door is opened, as determined in step 348 by checking a switch operated by opening the door, or when a time out condition occurs, as determined in step 350 the process ends in step 352. According to a further alternate embodiment, a credit card may be used in lieu of a pre-purchased debit card.

The system may maintain purchase records and inventory levels within an onboard processing system, and periodically transmit data regarding purchases and inventory levels to a remote computer system via wireless communication link. In a preferred embodiment, various portable dispensing systems will transmit data to a remote, but local, computer system (such as a computer located at a golf course club house), which local computer system is in electronic communication with a master computer system over a computer network. In this manner a master central computer system accumulates purchase, inventory, and accounting information for all portable dispensing systems in use throughout the world.

EXAMPLE

The portable dispensing device is mounted on the vehicle, vessel or object. In this example a vehicle such as a golf cart is used.

Prior to being inserted in the portable dispensing device, portable inserts are stocked at a central location with items to be dispensed. In this example, a configuration of four portable inserts as seen in FIG. 1 is used, each having three container rows. An external dispensing device is attached to one side of the portable dispensing device. One portable insert is stocked with a different brand of beer in each of the three container rows. Likewise, one portable insert is stocked with three varieties of soft drinks. A larger portable insert is stocked with water, juice and non-carbonated drinks. The fourth smaller portable insert is stocked with three different types of snack food.

After being filled at the central location, the three portable inserts that contain beverages are kept refrigerated so the items inside will be cold when they are placed inside the portable dispensing device.

An attendant resets the metering device and opens the top cover of the portable dispensing device to load the four portable inserts in their respective dispensing rows, and removes the portable insert covers from the portable inserts to allow the items to move into place for dispensing. Two cold packs are placed in the space between the dividers between the first and second, and second and third portable inserts. The divider between the third and fourth portable inserts (from right to left in FIG. 1) is insulated since the fourth row contains snack foods that do not need to be refrigerated, and the insulation in the divider assists in keeping the items in the first three rows cold. The top cover is then closed and secured. The attendant also checks the contents of the external dispensing device and places a plastic seal on the door.

While the consumers are out golfing, each time a dispensing door is opened, the appropriate charge is recorded by the metering device. If one golfer opens the external dispensing device, the seal is broken which will alert the attendant to inventory the contents when the vehicle is returned.

When the vehicle is returned, the attendant reads and resets the metering device, notes the status of the seal on the external dispensing device and takes an inventory and restocks if necessary. The appropriate charges are assessed to the consumer.

To prepare the portable dispensing device for the next round of use, the attendant unlatches the toggle latches on the mounting bracket, tilts the portable dispensing device back to cause the items inside the dispensing doors to move back into the portable inserts, and the prop is put in place to hold the portable dispensing device in the tilted back position. Then the attendant unlocks and opens the top cover, replaces the portable insert covers over the portable inserts, and removes then together with the cold packs. Those items are returned the central location where they can be refilled and cooled for a later use. The prop is then released, the portable dispensing device is tipped forward and the toggle latches on the mounting bracket are relatched. Fresh portable inserts and cold packs are placed inside the portable dispensing device, the portable insert covers are removed, and the top cover is closed and locked. The external dispensing device is restocked and resealed and the portable dispensing device is ready for the next consumer. It should be noted that the turnaround time has been minimized in this preferred embodiment by the used of pre-stocked portable inserts as opposed to loading the items one-by-one, and the beverages inside are freshly cooled for the next consumer It should also be noted that in the preferred embodiment that if a portable dispensing device returns with a malfunctioning part such as a broken dispensing door or defective metering device, the front panel can be replaced quickly by the attendant which also serves to minimize downtime, and the defective front panel can be repaired separately, without taking the portable dispensing device out of service or having to remove it from its mount.

The device as a whole, or components thereof, may be weighed as they are checked out and checked back in, in order to provide a double check on the accounting. Thus, the weight of a subunit should correspond to a number of vends from that subunit, varying by an integral number times the weight of the item vended.

The foregoing embodiments have been presented for the purpose of illustration and description only and are not to be construed as limiting the scope of the invention in any way. One of ordinary skill in the art will be able to make and use the invention by following the guidelines provided herein. The scope of the invention is to be determined from the claims appended hereto.

What is claimed is:

1. A portable dispensing system adapted for attachment to a golf cart for selectively dispensing refreshments and sundries, said dispensing system comprising:

a housing including means for removably attaching the housing to a golf cart;

said housing including a snack-holding portion, a thermally insulated beverage-holding portion, and a refrigeration portion;

said snack-holding portion adapted with a plurality of snack-holding bins adapted to hold snacks in a generally vertically stacked column of like snacks, each bin including a snack-releasing mechanism for selectively releasing a snack to a dispensing region upon payment, said dispensing region including a door configurable from a locked configuration to an unlocked configuration;

said snack-releasing mechanism comprises a plurality of vertically disposed sliding platforms for separating individual snacks within each snack-holding bin, each of said sliding platforms movable from an extended configuration wherein a snack is supported within a bin by said platform, to a retracted configuration wherein the snack is not supported by said platform and allowed to move to said dispensing region, and said door is unlocked;

said beverage-holding portion adapted with a plurality of beverage holding bins, each beverage holding bin adapted to hold beverages in a generally vertically stacked column of like beverages, each beverage holding bin including a beverage-releasing mechanism for selectively releasing a beverage to a dispensing region upon payment, said dispensing region including a door configurable from a locked configuration to an unlocked configuration;

said beverage-releasing mechanism comprises a gate, said gate configurable from a closed configuration wherein beverages are maintained within said bin, to an open configuration wherein a single beverage is allowed to move to said dispensing region, and said door is unlocked;

said refrigeration portion including means for cooling said beverage-holding portion; and an inventory management system for controlling and monitoring the dispensing of snacks and beverages, said inventory management system including means for electronically accepting payment, means for releasing snacks and beverages upon receipt of payment, and means for monitoring inventory levels, and means for wirelessly communicating with a remote terminal.

2. The portable dispensing system of claim 1, wherein said means for electronically accepting payment includes a debit card reader and pre-paid debit cards.

3. The portable dispensing system of claim 1, wherein said inventory management system further includes means for preventing the dispensing of selected beverages via wireless communication from a remote location.

4. The portable dispensing system of claim 1, wherein said means for cooling said beverage-holding portion comprises an electrically powered vapor compression refrigeration system.

5. The portable dispensing system of claim 1, wherein said means for removably attaching the housing to a golf cart comprises adapting the dimensions of a lower housing portion for inserted reception within a golf cart cargo basket.

6. The portable dispensing system of claim 5, wherein said means for removably attaching the housing to a golf cart further comprises a pair of belts for fastening said housing to portions of a golf cart.

7. The portable dispensing system of claim 1, wherein said housing is adapted to receive a secondary dispensing system removably attached thereto.

8. The portable dispensing system of claim 1, further adapted to dispense sundries, including golf balls, golf tees, golf gloves, and yardage books.

9. The portable dispensing system of claim 1, wherein each dispensing door comprises a substantially transparent material.

10. The portable dispensing system of claim 1, wherein each dispensing door is marked with an indication of the item that is dispensed through the dispensing door.

11. The portable dispensing system of claim 1, further including at least one sensing device sensing a dispensing of one or more items from said housing.

12. The portable dispensing system of claim 1, wherein said inventory management system includes an accounting subsystem programmed with data relating to the price of each item, and stores and displays the total charges for all items removed during use, and wherein the total charges are resettable.

* * * * *